(12) United States Patent
Don et al.

(10) Patent No.: US 7,751,407 B1
(45) Date of Patent: Jul. 6, 2010

(54) SETTING A CEILING FOR BANDWIDTH USED BY BACKGROUND TASKS IN A SHARED PORT ENVIRONMENT

(75) Inventors: Arieh Don, Newton, MA (US); James L. Davidson, Tyngsboro, MA (US)

(73) Assignee: EMC Corporation, Hopkinton, MA (US)

( * ) Notice: Subject to any disclaimer, the term of this patent is extended or adjusted under 35 U.S.C. 154(b) by 823 days.

(21) Appl. No.: 11/324,992

(22) Filed: Jan. 3, 2006

(51) Int. Cl.
*H04L 12/56* (2006.01)
(52) U.S. Cl. .................................. 370/395.21
(58) Field of Classification Search ............ 370/395.21, 370/395.4, 395.41, 468
See application file for complete search history.

(56) References Cited

U.S. PATENT DOCUMENTS

| | | | |
|---|---|---|---|
| 5,206,939 A | | 4/1993 | Yanai et al. |
| 5,210,866 A | * | 5/1993 | Milligan et al. ................. 714/6 |
| 5,778,394 A | | 7/1998 | Galtzur et al. |
| 5,832,484 A | * | 11/1998 | Sankaran et al. ................ 707/8 |
| 5,845,147 A | | 12/1998 | Vishlitzky et al. |
| 5,857,208 A | | 1/1999 | Ofek |
| 6,067,557 A | * | 5/2000 | Hegde .......................... 718/103 |
| 6,219,704 B1 | * | 4/2001 | Kim et al. .................... 709/224 |
| 6,292,855 B1 | * | 9/2001 | Johnson et al. ................ 710/33 |
| 6,515,963 B1 | * | 2/2003 | Bechtolsheim et al. ...... 370/229 |
| 7,127,545 B1 | * | 10/2006 | Nandi et al. ................. 710/316 |
| 2005/0132375 A1 | * | 6/2005 | Douceur et al. ............. 718/100 |
| 2006/0090163 A1 | * | 4/2006 | Karlsson et al. ............. 718/105 |
| 2007/0064604 A1 | * | 3/2007 | Chen et al. .................. 370/230 |

* cited by examiner

*Primary Examiner*—Derrick Ferris
*Assistant Examiner*—Mohammad Anwar
(74) *Attorney, Agent, or Firm*—Muirhead and Saturnelli, LLC

(57) ABSTRACT

Controlling communication through a communication resource includes allocating a percentage of a maximum bandwidth of the communication resource to a subset of processes that communicate using the resource, determining a delay amount between I/O operations, where the delay amount corresponds to the percentage of bandwidth allocated to the subset of processes, and waiting an amount of time corresponding to the delay amount between I/O operations for the subset of processes. The delay amount may be increased in response to the actual I/O throughput being greater than an amount corresponding to the percentage of the maximum bandwidth allocated to the subset of processes. The delay amount may be decreased in response to the actual I/O throughput being less than an amount corresponding to the percentage of the maximum bandwidth allocated to the subset of processes.

20 Claims, 24 Drawing Sheets

| Track No. | 1 | 2 | 3 | .. | N-1 | N |
|---|---|---|---|---|---|---|
| Migrate | 1 | 1 | 1 | .. | 1 | 1 |

FIGURE 4

| Track No. | Changed |
|---|---|
| 1 | 0 |
| 2 | 0 |
| 3 | 0 |
| .. | .. |
| .. | .. |
| N-1 | 0 |
| N | 0 |

FIGURE 10

SETTING A CEILING FOR BANDWIDTH USED BY BACKGROUND TASKS IN A SHARED PORT ENVIRONMENT

BACKGROUND

1. Technical Field

This application generally relates to a data storage system, and more particularly to techniques used with copying data.

2. Description of Related Art

Host processor systems may store and retrieve data using a storage device containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels of the storage device and the storage device provides data to the host systems also through the channels. The host systems do not address the disk drives of the storage device directly, but rather, access what appears to the host systems as a plurality of logical volumes. The logical volumes may or may not correspond to the actual disk drives.

The storage devices may be interconnected to allow for the transfer of data therebetween. In some cases, connection points on the storage devices ("ports") are shared between hosts and other storage devices so that, for example, a port of a storage device may have both a host and another storage device coupled thereto. However, if a background task related to the interconnection of the storage devices (e.g., a copy between storage devices) uses too much of the data bandwidth of the port, the result may be that host I/O is starved. Accordingly, it is desirable to provide a mechanism to manage port accesses of background I/O tasks and Host I/O tasks.

SUMMARY OF THE INVENTION

According to the present invention, controlling communication through a communication resource includes allocating a percentage of a maximum bandwidth of the communication resource to a subset of processes that communicate using the resource, determining a delay amount between I/O operations, where the delay amount corresponds to the percentage of bandwidth allocated to the subset of processes, and waiting an amount of time corresponding to the delay amount between I/O operations for the subset of processes. Controlling communication through a communication resource may also include periodically recalculating the delay amount according to actual I/O throughput of the subset of processes. Actual I/O throughput may be determined by maintaining a byte count of data that is transferred for each I/O operation. The delay amount may be increased in response to the actual I/O throughput being greater than an amount corresponding to the percentage of the maximum bandwidth allocated to the subset of processes. The delay amount may be decreased in response to the actual I/O throughput being less than an amount corresponding to the percentage of the maximum bandwidth allocated to the subset of processes. In response to the actual I/O throughput being greater by at least a predetermined amount than an amount corresponding to the percentage of the maximum bandwidth allocated to the subset of processes, the delay amount may be set to a default value. The subset of processes may be background processes for copying data. Other processes that are not background processes may include processes that service I/O operations of a host coupled to a storage device. The delay amount may be determined by taking the inverse of the product of the maximum bandwidth, the percentage, and the amount of data transmitted for each I/O operation.

According further to the present invention, computer software, in a computer-readable storage medium, that controls communication through a communication resource, includes executable code that determines a delay amount between I/O operations, where the delay amount corresponds to a percentage of maximum bandwidth of the communication resource allocated to the subset of processes and executable code that waits an amount of time corresponding to the delay amount between I/O operations for the subset of processes. The computer software may also include executable code that periodically recalculates the delay amount according to actual I/O throughput of the subset of processes. Actual I/O throughput may be determined by maintaining a byte count of data that is transferred for each I/O operation. The computer software may also include executable code that increases the delay amount in response to the actual I/O throughput being greater than an amount corresponding to the percentage of the maximum bandwidth allocated to the subset of processes and executable code that decreases the delay amount in response to the actual I/O throughput being less than an amount corresponding to the percentage of the maximum bandwidth allocated to the subset of processes. The computer software may also include executable code that sets the delay amount to a default value in response to the actual I/O throughput being greater by at least a predetermined amount than an amount corresponding to the percentage of the maximum bandwidth allocated to the subset of processes. The subset of processes may be background processes for copying data. Other processes that are not background processes may include processes that service I/O operations of a host coupled to a storage device. The delay amount may be determined by taking the inverse of the product of the maximum bandwidth, the percentage, and the amount of data transmitted for each I/O operation.

According further to the present invention, a storage device, includes a plurality of disks that contain data and at least one port, coupled to the disks, for providing access to data stored on the disks, where the at least one port includes software having executable code that determines a delay amount between I/O operations for a subset of processes that communicate with the storage device through the port, wherein the delay amount corresponds to a percentage of maximum bandwidth of the port allocated to the subset of processes, and executable code that waits an amount of time corresponding to the delay amount between I/O operations for the subset of processes. The software of the port may also include executable code that increases the delay amount in response to the actual I/O throughput being greater than an amount corresponding to the percentage of the maximum bandwidth allocated to the subset of processes and executable code that decreases the delay amount in response to the actual I/O throughput being less than an amount corresponding to the percentage of the maximum bandwidth allocated to the subset of processes. The subset of processes may be background processes for copying data between the storage device and another storage device. Other processes that are not background processes may include processes that service host I/O operations for the storage device.

BRIEF DESCRIPTION OF THE DRAWINGS

FIG. 4 is an example of an embodiment of a migration bitmap;

FIG. 10 is an example of an embodiment of a change bitmap;

DETAILED DESCRIPTION OF EMBODIMENT(S)

Figure 1:
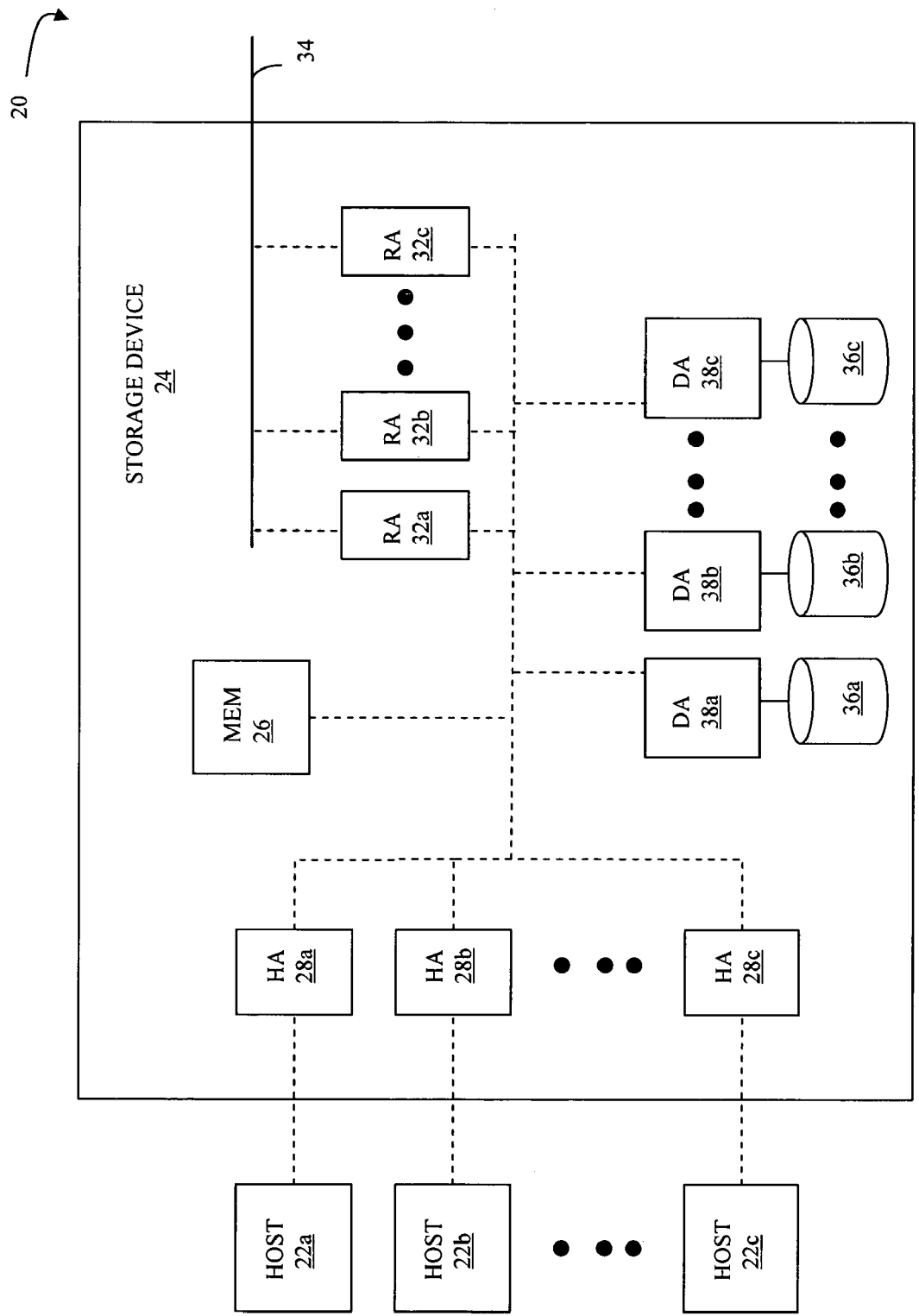
FIG. 1 is a schematic diagram showing a plurality of hosts and a data storage device used in connection with the system described herein.

Referring to FIG. 1, a diagram 20 shows a plurality of hosts 22a-22c coupled to a data storage device 24. The data storage device 24 includes an internal memory 26 that facilitates operation of the storage device 24 as described elsewhere herein. The data storage device also includes a plurality of host adaptors (HA's) 28a-28c that handle reading and writing of data between the hosts 22a-22c and the storage device 24. Although the diagram 20 shows each of the hosts 22a-22c coupled to each of the HA's 28a-28c, it will be appreciated by one of ordinary skill in the art that one or more of the HA's 28a-28c may be coupled to other hosts. In an embodiment herein, one or more of the HA's 28a-28c may be a Fibre Channel adaptor (FA) coupled to one or more host(s) and/or one or more additional storage devices(s).

The storage device 24 may include one or more RDF adapter units (RA's) 32a-32c. The RA's 32a-32c are coupled to an RDF link 34 and are similar to the HA's 28a-28c, but are used to transfer data between the storage device 24 and other storage devices (not shown) that are also coupled to the RDF link 34. The storage device 24 may be coupled to addition RDF links (not shown) in addition to the RDF link 34.

The storage device 24 may also include one or more disks 36a-36c, each containing a different portion of data stored on the storage device 24. Each of the disks 36a-36c may be coupled to a corresponding one of a plurality of disk adapter units (DA) 38a-38c that provides data to a corresponding one of the disks 36a-36c and receives data from a corresponding one of the disks 36a-36c. Note that, in some embodiments, it is possible for more than one disk to be serviced by a DA and that it is possible for more than one DA to service a disk.

The logical storage space in the storage device 24 that corresponds to the disks 36a-36c may be subdivided into a plurality of volumes or logical devices. The logical devices may or may not correspond to the physical storage space of the disks 36a-36c. Thus, for example, the disk 36a may contain a plurality of logical devices or, alternatively, a single logical device could span both of the disks 36a, 36b. The hosts 22a-22c may be configured to access any combination of logical devices independent of the location of the logical devices on the disks 36a-36c.

One or more internal logical data path(s) exist between the DA's 38a-38c, the HA's 28a-28c, the RA's 32a-32c, and the memory 26. In some embodiments, one or more internal busses and/or communication modules may be used. In some embodiments, the memory 26 may be used to facilitate data transferred between the DA's 38a-38c, the HA's 28a-28c and the RA's 32a-32c. The memory 26 may contain tasks that are to be performed by one or more of the DA's 38a-38c, the HA's 28a-28c and the RA's 32a-32c, and a cache for data fetched from one or more of the disks 36a-36c. Use of the memory 26 is described in more detail hereinafter.

The storage device 24 may be provided as a stand-alone device coupled to the hosts 22a-22c as shown in FIG. 1 or, alternatively, the storage device 24 may be part of a storage area network (SAN) that includes a plurality of other storage devices as well as routers, network connections, etc. The storage device may be coupled to a SAN fabric and/or be part of a SAN fabric. The system described herein may be implemented using software, hardware, and/or a combination of software and hardware where software may be stored in an appropriate storage medium and executed by one or more processors.

Figure 2:
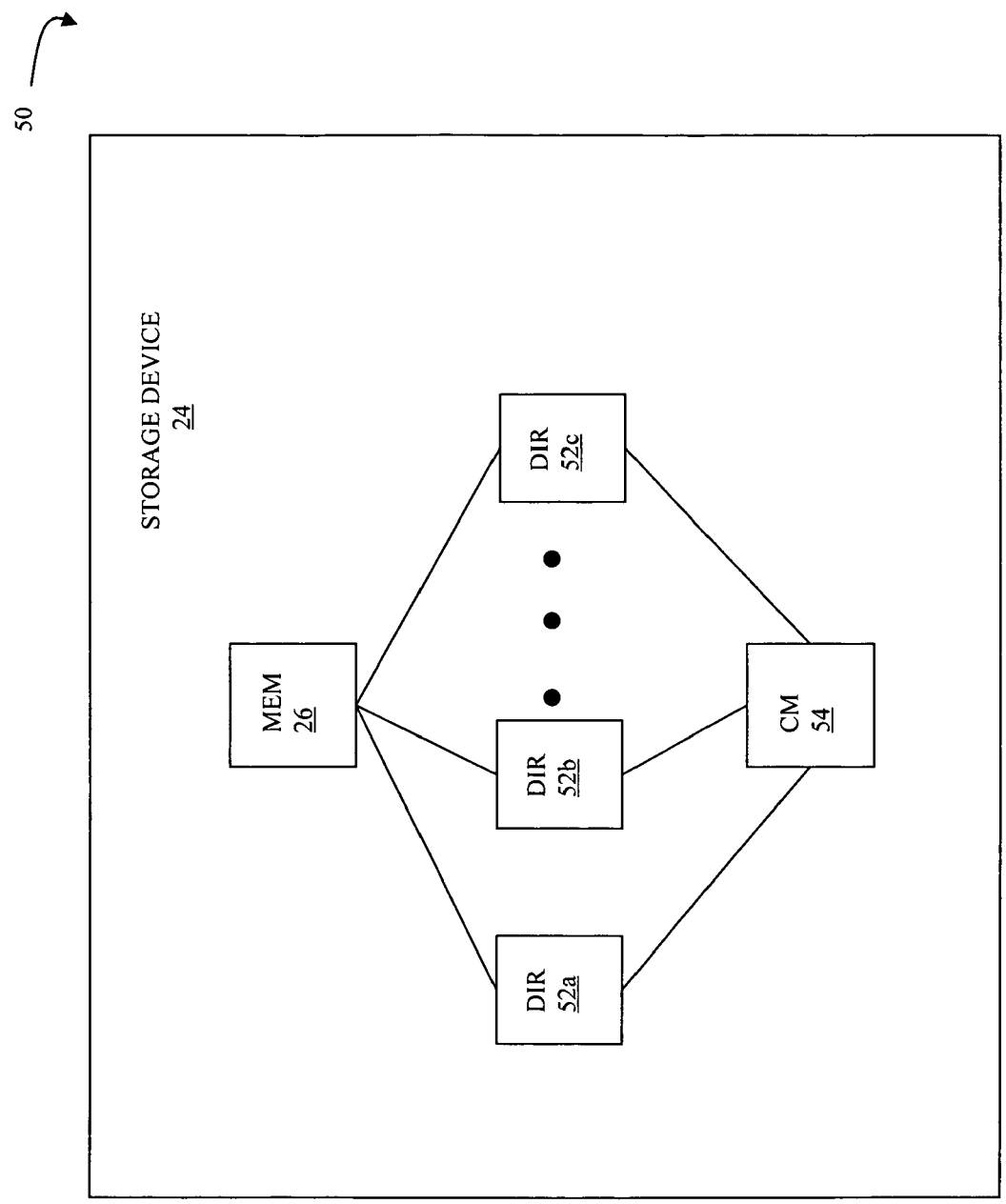
FIG. 2 is a schematic diagram showing a storage device, memory, a plurality of directors, and a communication module according to the system described herein.

Referring to FIG. 2, a diagram 50 illustrates an embodiment of the storage device 24 where each of a plurality of directors 52a-52c are coupled to the memory 26. Each of the directors 52a-52c represents one of the HA's 28a-28c, RA's 32a-32c, or DA's 38a-38c. In an embodiment disclosed herein, there may be up to sixty-four directors coupled to the memory 26. Of course, for other embodiments, there may be a higher or lower maximum number of directors that may be used.

The diagram 50 also shows an optional communication module (CM) 54 that provides an alternative communication path between the directors 52a-52c. Each of the directors 52a-52c may be coupled to the CM 54 so that any one of the directors 52a-52c may send a message and/or data to any other one of the directors 52a-52c without needing to go through the memory 26. The CM 54 may be implemented using conventional MUX/router technology where a sending one of the directors 52a-52c provides an appropriate address to cause a message and/or data to be received by an intended receiving one of the directors 52a-52c. Some or all of the functionality of the CM 54 may be implemented using one or more of the directors 52a-52c so that, for example, the directors 52a-52c may be interconnected directly with the interconnection functionality being provided on each of the directors 52a-52c. In addition, a sending one of the directors 52a-52c may be able to broadcast a message to all of the other directors 52a-52c at the same time.

Figure 3:
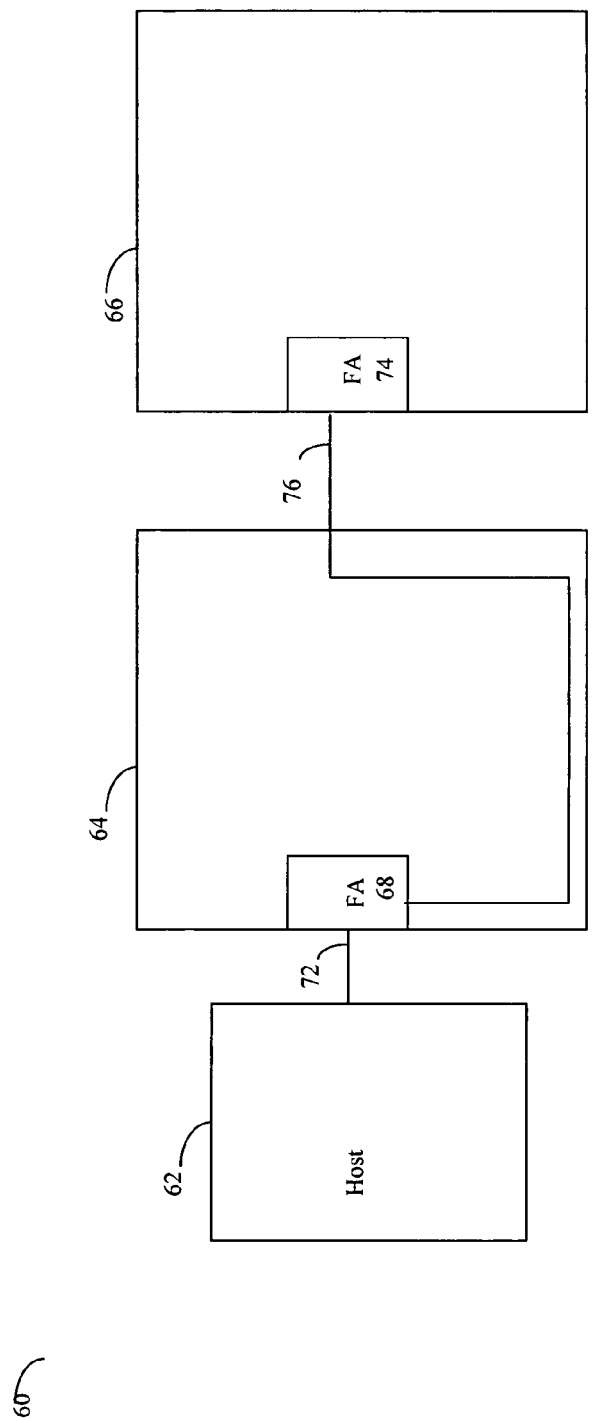
FIG. 3 is a simplified illustration of an example of an embodiment of the computer system of FIGS. 1 and 2.

Referring to FIG. 3, a diagram 60 shows a host 62, a first storage device 64 and a second storage device 66. The storage devices 64, 66 are like the storage device 24 described in more detail above. The first storage device 64 may have a first Fibre Channel Adaptor (FA) 68. The host 62 may use the FA 68 as an HA. The host 62 may exchange data and commands with the first storage device 64 through a first connection 72 between the host 62 and the FA 68. In an embodiment herein, the FA 68 (and possibly other FA's) includes facilities for executing software, such as a processor, memory, etc. (not shown).

The second storage device 66 may have a second FA 74 used for exchanging data and commands with the second storage device 66. The first storage device 64 may be coupled to and communicate with the second storage device 66 using a second connection 76 between the first FA 68 and the second FA 74. Data may be copied from the first storage device 64 to the second storage device 66 using the connection 76.

Noted that the embodiment illustrated in FIG. 3 is an example for the sake of illustration and that the system described herein may include any number of interconnected hosts and storage devices.

The host 62 or some other entity may issue a command to cause data to be copied between the storage devices 64, 66 while the storage device remains accessible to the host 62 for I/O and other operations between the host and the storage device 64. In some embodiments, the FA 68 may execute software to perform the data copying.

Figure 4:
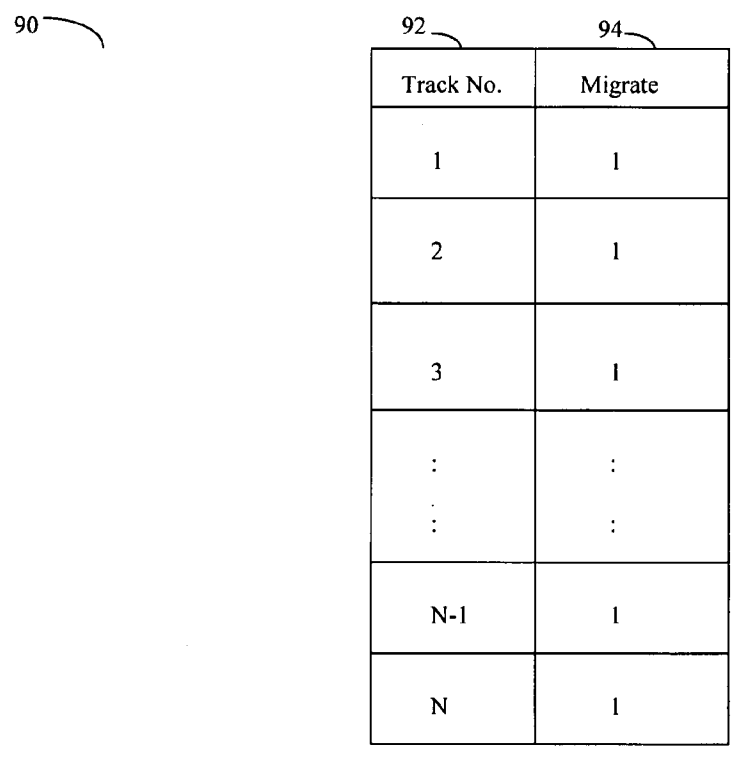

Referring to FIG. 4, a migration bitmap 90 includes a column 92 indicating track numbers of logical devices of the storage device 64 and a column 94 for corresponding migration status bits. In an embodiment illustrated herein, each bit entry has a value of one initially indicating that the track of data is not yet migrated or copied. A value of zero indicates that the corresponding track of data has been migrated. The migration bitmap 90 may be stored in memory of the storage device 64. The copy operation may cause the migration bitmap 90 to be updated as data is copied from the storage device 64 to the storage device 66.

Additionally, while data is being copied from the storage device 64 to the storage device 66, the storage device 64 may process incoming I/O requests and possibly other requests from the host 62 and/or other sources (e.g., other hosts).

Figure 5:
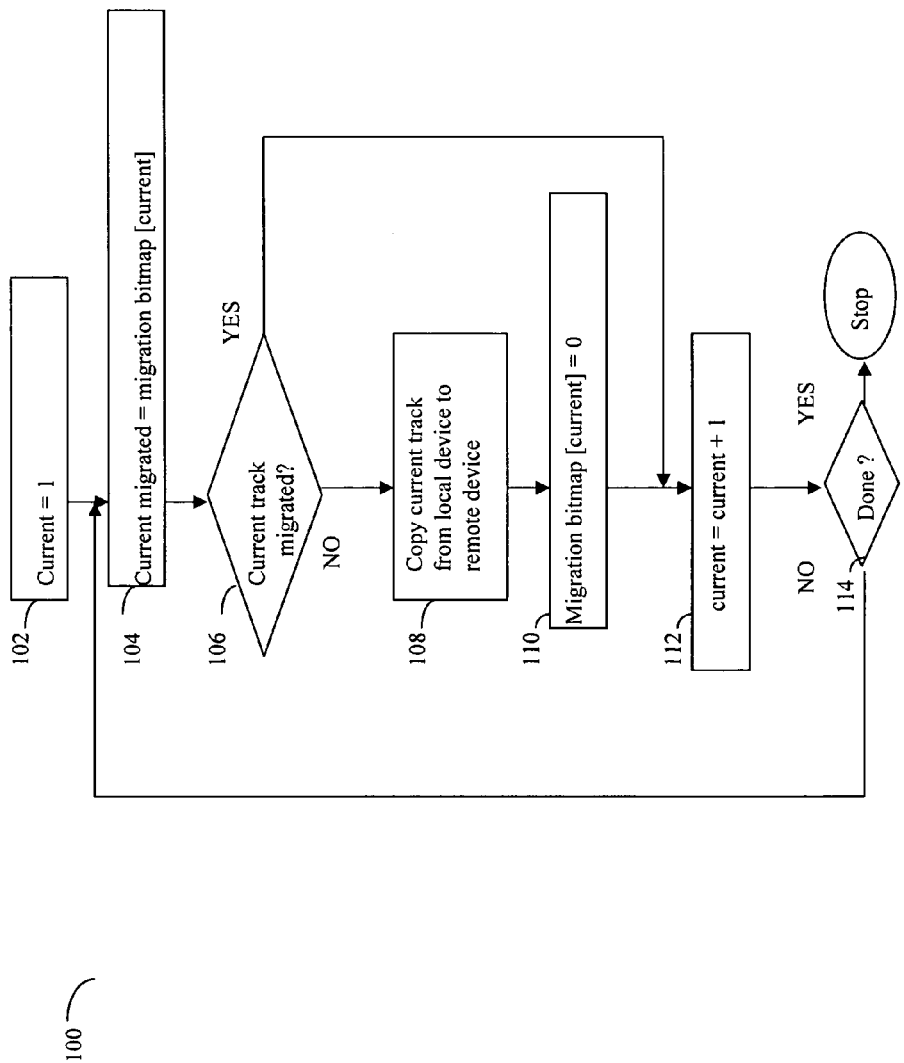
FIG. 5 is a flowchart of processing steps of one embodiment for performing a copy operation.

Referring to FIG. 5, a flowchart 100 illustrates steps that may be performed in connection with performing a copy operation. The steps of flowchart 100 may be performed, for example, by the FA 68, when copying data from the storage device 64 to the storage device 66. Processing begins at a step 102 where a variable, current, is assigned a value of one to identify a current track of a logical device of the storage device 64 that is being copied by the copy operation. Following the step 102 is a step 104 where another, variable, current migrated, is assigned a value corresponding to a migrated bitmap element associated with the current track. Following the step 104 is a step 106 where a determination is made as to whether the current track has been migrated. The test at the step 106 uses the value obtained from the migrated bitmap at the step 104. If a determination is made at step 106 that the current track has been migrated, then control passes to a step 112, where the variable current is incremented by one to facilitate copying the next track. Following the step 112 is a test step 114 where a determination is made as to whether the copying operation is complete. If so, processing is complete. Otherwise, control transfers from the step 114 back to the step 104 to perform the next iteration.

If at the step 106 it is determined that the current track has not yet been migrated, then control transfers from the step 106 to a step 108 where the current track of data is copied from the storage device 64 to the storage device 66. Following the step 108 is a step 110 where an element of the migrate bitmap 90 corresponding to the track copied at the step 108 is updated to indicate that the current track has been migrated. Following the step 110 is the step 112, discussed above.

Figure 6:
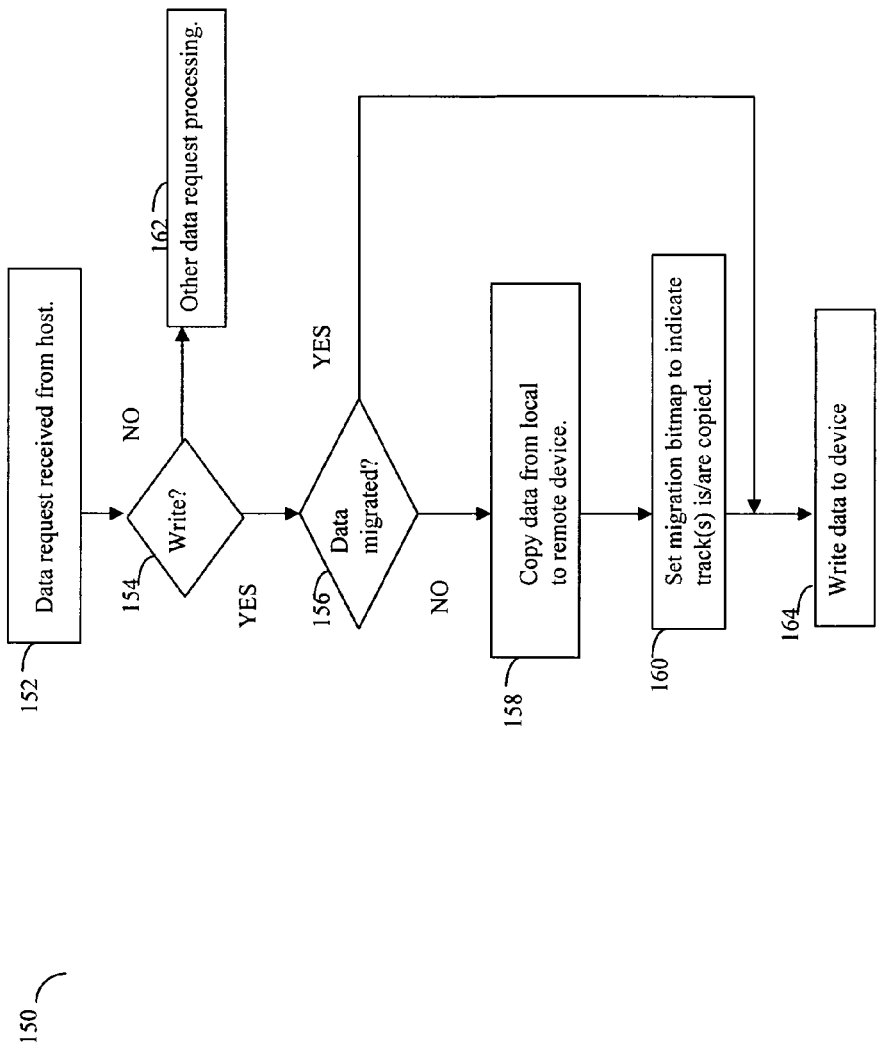
FIG. 6 is a flowchart of processing steps of one embodiment for processing an incoming data request.

Referring to FIG. 6, a flowchart 150 illustrates steps that may be performed in connection with processing an incoming I/O or other request to a storage device, such as the storage device 64 of FIG. 3. The steps of flowchart 150 may be performed, for example, by the FA 68. Processing begins at a step 152 where the data request is received from the host 62. Following the step 152 is a step 154 where a determination is made as to whether the data request is a write request. Note that the write request may be for writing a portion of a single track of data, or one or more tracks of data.

If it is determined at the step 154 that the data request is not for a write operation, then control passes from the step 154 to a step 162 to perform the data request. Otherwise, if it is determined at the step 154 that the data request is a write request, then control transfers from the step 154 to a step 156 where it is determined if the target location for the write operation has been migrated already. Note that the target location may be one or more tracks of data. If it is determined at the step 156 that the data has been migrated, then control transfers from the step 156 to a step 164 where the write operation is performed. Otherwise, if it is determined at the step 156 that the data has not yet been migrated, then control transfers from the step 156 to a step 158 where the data is first copied or migrated from the storage device 64 to the storage device 66. Following the step 158 is a step 160 where the migration bitmap 90 is modified to indicate the one or more tracks that were migrated at the step 158. Following the step 160 is the step 164, discussed above.

Note that the operation described above where data is copied from the storage device 64 to the storage device 66 may be characterized as a "push" of data from the storage device 64 to the storage device 66. While the data is copied from the storage device 64 to the storage device 66, the local device is available for use by the host 62. Data may also be migrated in a reverse direction or "pulled" from the storage device 66 to the storage device 64. Such processing may also be performed while the storage device 64 is online for use by the host 62. The copy processing performed by the FA 68 may pull the data from the storage device 66 to the storage device 66. The foregoing processing techniques may utilize a migration bitmap when performing a data migration for both the push and the pull cases while the storage device 64 is being accessed by the host 62.

Figure 7A:
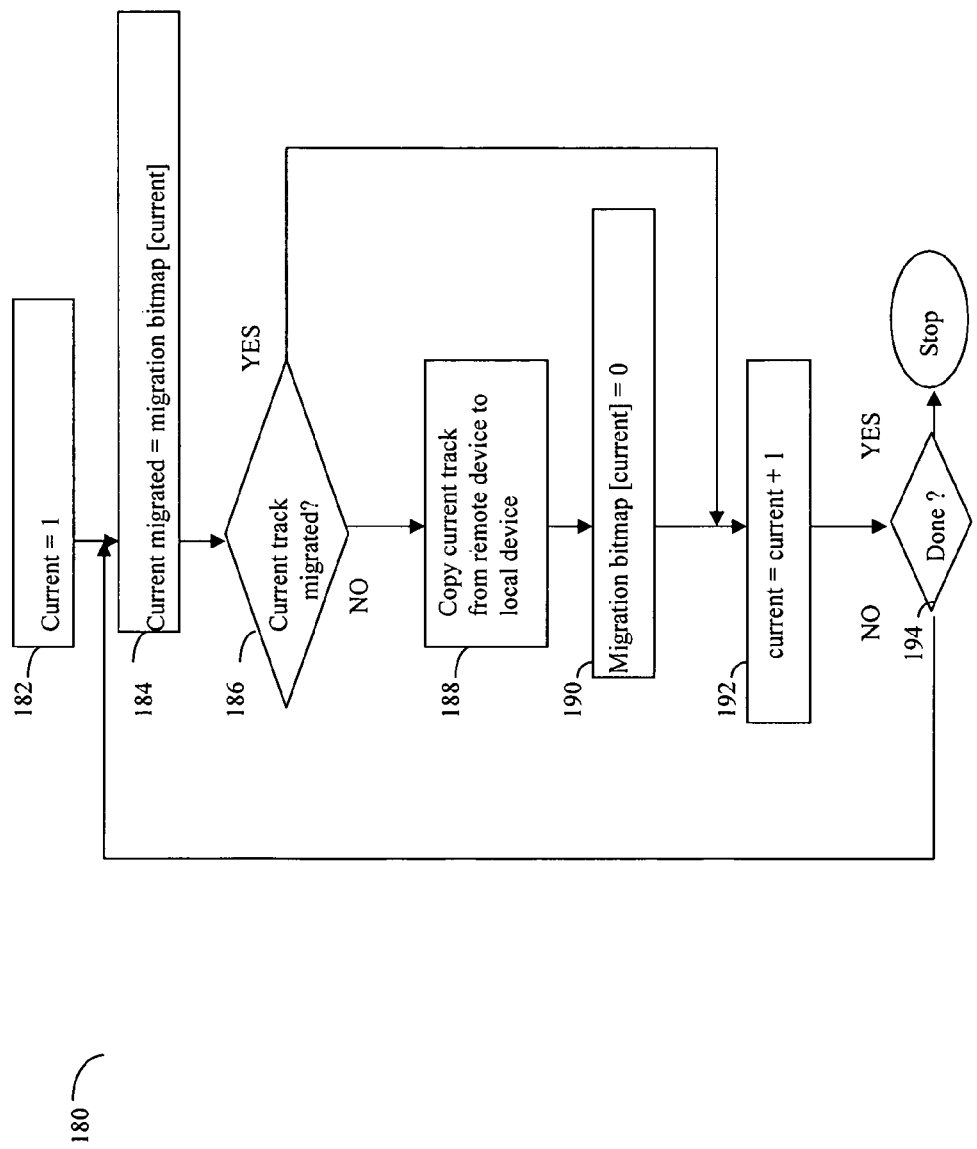
FIG. 7A is a flowchart of processing steps of another embodiment for performing a copy operation.

Referring to FIG. 7A, a flowchart 180 illustrates steps that may be performed by the FA 68 in connection with a copy operation where data is copied from the storage device 66 to the storage device 64 using the migration bitmap 90 described elsewhere herein. Note that the steps of FIG. 7A are similar to those as described in connection with FIG. 5 except for the step 188 where data is copied for the current track from the storage device 66 to the storage device 64.

Figure 7B:
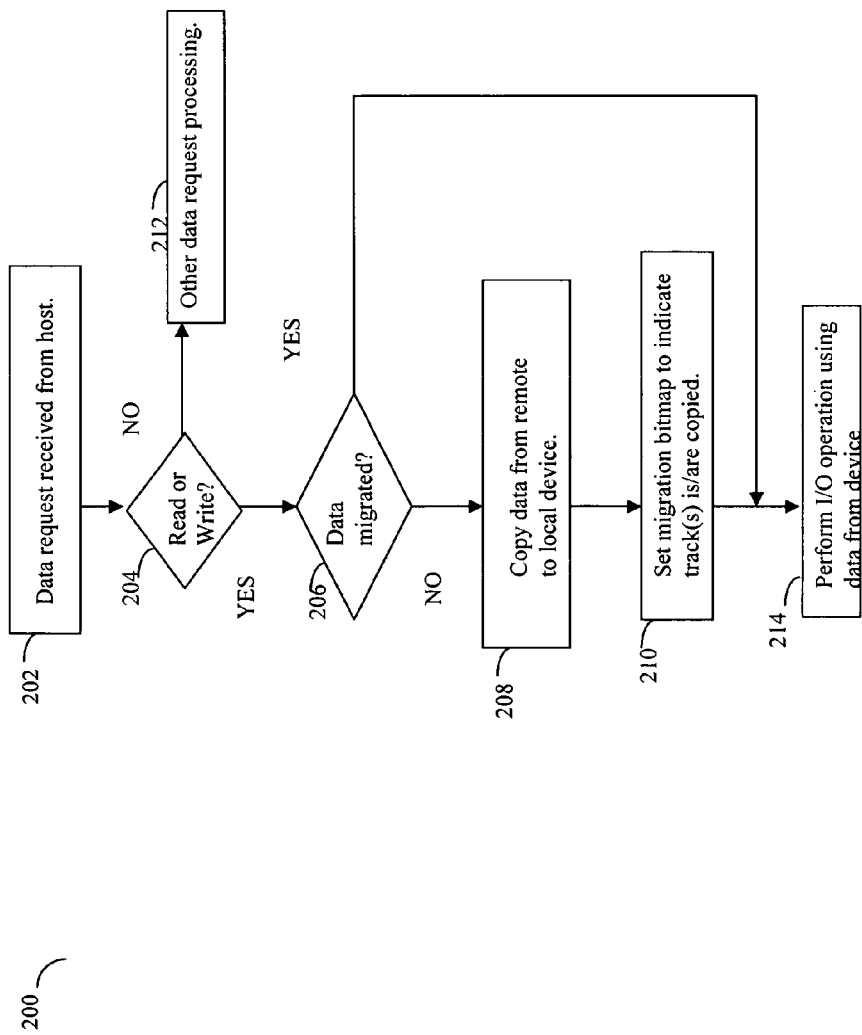
FIG. 7B is a flowchart of processing steps of another embodiment for processing an incoming data request.

Referring to FIG. 7B, a flowchart 200 illustrates steps performed in connection with handling incoming I/O and other requests received by the storage device 64 from the host 62 while data is being pulled from the storage device 66 to the storage device 64. The processing illustrated by the flowchart 200 may be performed, for example, by the FA 68.

Processing begins at a step 202 where a data request (I/O request or other type of request) by the storage device 64 is received from the host 62. Following the step 202 is a step 204 where a determination is made as to whether the data request is for a read or a write operation. If the request is not for a read or write operation, then control transfers from the step 204 to a step 212 to perform the data request. Otherwise, if it is determined at the step 204 that the data request is for a read operation or for a write operation, then control transfers from the step 204 to a test step 206 where it is determined whether the target location corresponding to the read or write request has already received data according to the migration. The test at the step 206 determines if the data has already been moved. If so, then control transfers from the step 206 to a step 214 to perform the read or write operation. Otherwise, if it is determined at the step 206 that the target location has not yet received migrated data, then control transfers from the step 206 to a step 208 where the data is first copied from the storage device 66 to the storage device 64. Following the step 208 is a step 210 where a corresponding one or more entries in the migration bitmap 90 are updated to indicate that the corresponding data has been migrated. Following the step 210 is the step 214, discussed above.

Note when data is being migrated from the storage device 64 to the storage device 66, the system may take one or more appropriate actions. For example, the system may retry accessing a storage device a specified number of times prior to issuing an error and aborting the data request. Other types of appropriate processing may also be performed.

The system described herein may be extended for access by more than one host.

Figure 8:
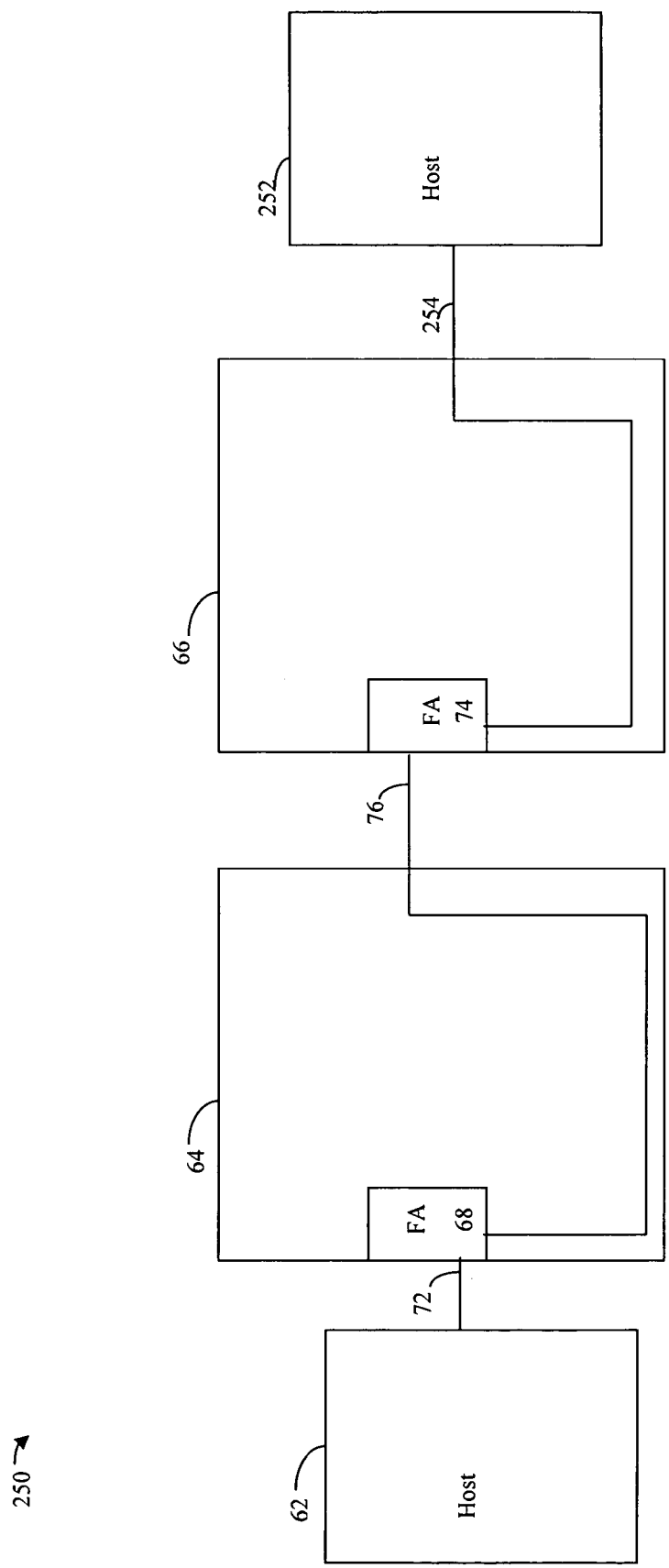
FIG. 8 is an example of an embodiment of a system that may be used in connection with performing an online data migration using the techniques described herein.

Referring to FIG. 8, a diagram 250 illustrates an embodiment that uses multiple hosts. The components of FIG. 8 are similar to those described, for example, in connection with FIG. 3 with an additional host 252 connected to the storage device 66 via a connection 254. The host 252 communicates with the storage device 66 using the connection 254 in a manner similar to the way the host 62 communicates with storage device 64 over the connection 72. The storage device 66 may be characterized as local to the host 252 while the storage device 64 may be characterized as local to the host 62.

The techniques described herein may be used when both the source and destination of a data migration are available online for use by hosts while the data migration is ongoing. If a read or write operation occurs at the destination of the data migration, the data is migrated to the destination prior to performing the I/O operation. If a write operation is performed to the source of a data migration prior to migrating the data to the destination, the data is migrated from the source to the destination prior to executing the write operation.

The techniques described herein in connection with performing an online data migration may be used when both the host 62 and the host 252 are online and respectively accessing the storage devices 64, 66. Techniques for performing a data push or a data pull with respect to storage device 64 when both the storage devices 64, 66 and the hosts 62, 252 are online are described in more detail below.

Figure 9:
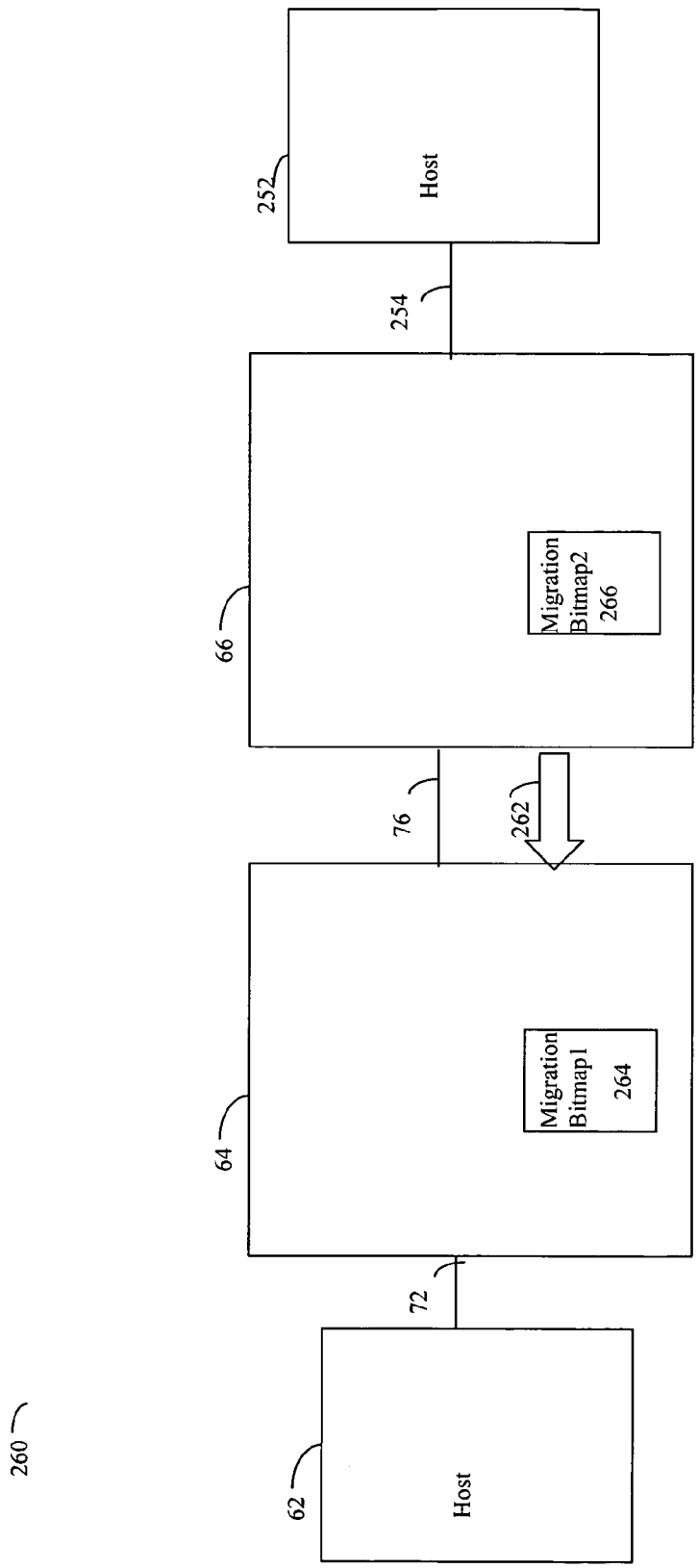
FIG. 9 is another representation of the components of FIG. 8.

Referring to FIG. 9, a diagram 260 illustrates another representation of the components of FIG. 8. Note that various elements are not shown in the diagram 260 for the sake of simplicity. The diagram 260 shows an example where an online data migration is being performed for a data pull as indicated by a directional arrow 262. In this example, data is being pulled from storage device 66 to the storage device 64 while the host 62 performs I/O operations with the storage device 64, and, additionally, while the host 252 performs I/O operations with the storage device 66.

The storage device 64 includes is a first migration bitmap 264 similar to the migration bitmap 90 described elsewhere herein. Similarly, the storage device 66 includes is a second migration bitmap 266 similar to the migration bitmap 90 described elsewhere herein. Each of the migration bitmaps 264, 266 may be stored in a global memory of each of the storage devices 64, 66.

When both the host 62 and the host 252 are accessing the storage devices 64, 66, code for performing the functionality illustrated herein may be executed by both the first storage device 64 and the second storage device 66. Code may be executed by the first storage device 64 which pulls the data from the storage device 66 to the storage device 64. The code that pulls the data from the storage device 66 to the storage device 64 may perform the processing steps shown in the flowchart 180 of FIG. 7A. The code may, for example, be executed on a Fibre Channel Adapter included in the first storage device 64. The code may also update the migration bitmap 264 of storage device 64 and may synchronize changes between the migration bitmap 264 and the migration bitmap 266 as used by the storage device 66. When the Fibre Channel Adapter of the first storage device 64 executes code to pull data from the second storage device 66, the migration bitmap 264 of the first storage device 64 is updated accordingly. Additionally, the code may communicate with the storage device 66 to cause the migration bitmap 266 of the second storage device 66 to be updated. The changes to the migration bitmap 264 may be propagated to the migration bitmap 266 using the connection 76.

Code may also be executed on the first storage device 64 to handle processing incoming I/O operation requests from the host 62. This code may perform processing steps as described, for example, in connection with the flowchart 200 of FIG. 7B. The code on the storage device 64 for processing incoming host I/O or data requests determines if the incoming request is for a read or write operation. If so, and the corresponding data has not yet been migrated from storage device 66, a data migration is performed prior to completing the read or write operation. This code for processing host I/O read and write operations on storage device 64 may also update the migration bitmaps 264, 266 of both the storage devices 64, 66 as data migration is performed.

The storage device 66 includes code for processing incoming I/O requests from the host 252. The code for processing incoming I/O requests may perform processing like that illustrated by the flowchart 150 of FIG. 6 in which a determination is made if the request is for a write operation from host 252. If so, and the data has not yet been migrated from the storage device 66 to the storage device 64, then the data is migrated to the storage device 64 before servicing the write request from the host 252. Handling I/O operations from the host 252 may also include updating the migration bitmaps 262, 264 of both the storage devices 64, 66 as data migration is performed.

When the code for performing a data pull from the storage device 66 to the storage device 64 is executed and the source device(s) are online, the code for the data pull may communicate with the storage device 66 to initiate execution of code on the storage device 66, such as to perform the data push when needed in accordance with the steps of flowchart 150 of FIG. 6.

As will be apparent to those of ordinary skill in the art, the system described herein may be extended to be used in connection with a push when both the source and the destination of a data migration are available online.

The system described herein may be used in connection with creating a point in time copy where data is either pushed to one or more destination devices or pulled from one or more of the source devices available online during the data migration. A migration bitmap may be used for a restoration to a point in time copy. A change bitmap may also be used to identify which particular tracks of data (or other appropriate portions of data) have been modified.

Figure 10:
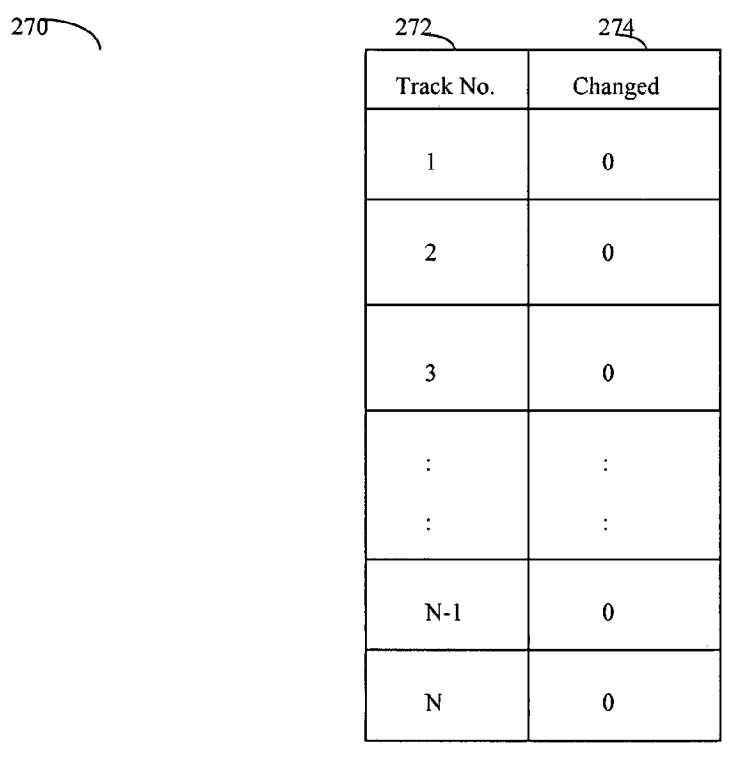

Referring to FIG. 10, a change bitmap 270 is used to indicate whether a particular track of data on a device has been modified with respect to a particular point in time copy. As discussed elsewhere herein, portions of data other than tracks may be used and it is possible for operations to be performed on partial tracks causing an entire track to be migrated prior to the operation.

The change bitmap 270 includes an entry in a column 272 for a particular track number of a device, and a bit value (boolean value) in a changed column 274 indicates whether the data on that particular track has been updated. In this embodiment, all of the elements in the changed column 274 are initialized to zero indicating that no modification has been made to the data. Modifications indicated by the changed bit in the column 274 are with respect to a particular point in time copy of the data. The bit value in column 274 for each particular track of data may be set to one when a write operation occurs on the corresponding track.

Figure 11:
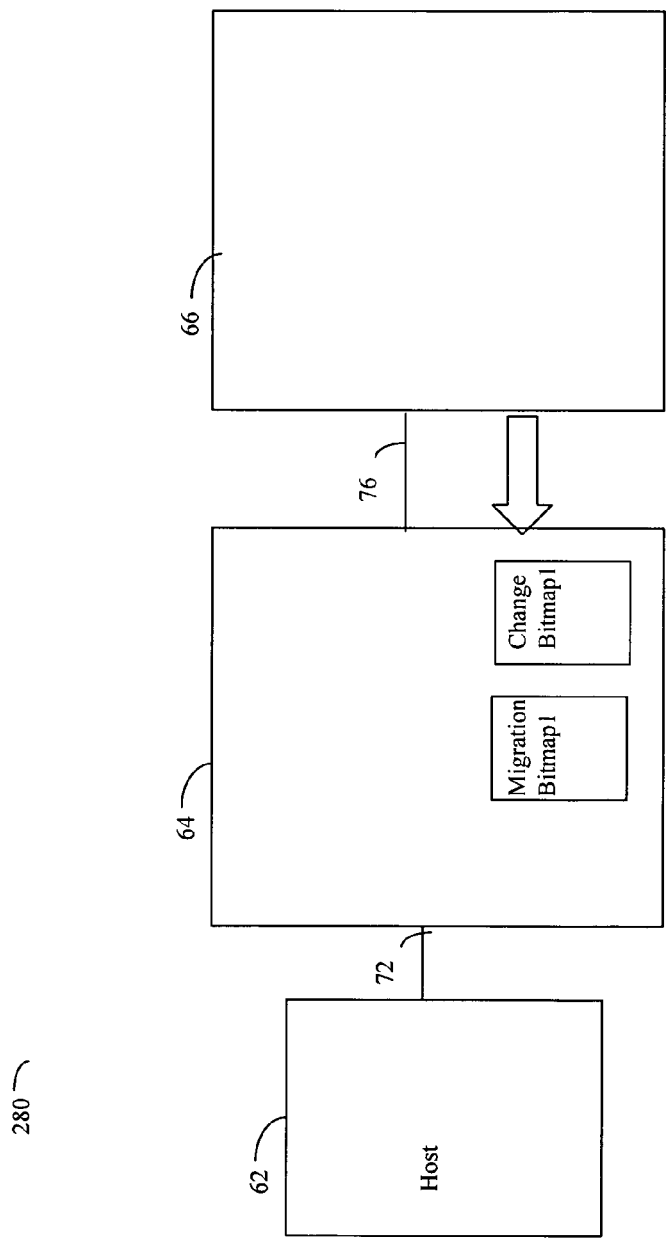
FIG. 11 is another example of an embodiment of a computer system illustrating use of techniques described herein.

Referring to FIG. 11, a diagram 280 shows the host 62 and the first and second storage devices 64, 66. Although the description here relates to use of the change bitmap with the migration bitmap for a data pull, those of ordinary skill in the art will recognize that the techniques described herein may also be used in connection with performing a data push from the storage device 64 to the storage device 66 using both the migration and change bitmaps.

A point in time copy may be made of one or more devices (e.g., logical volumes) from the storage device 64 to the storage device 66. The migration bitmap may indicate the status of the data migration for particular tracks as described elsewhere herein. Additionally, a change bitmap may be maintained which is updated each time the host 62 performs a write operation to a track, or a portion thereof, of the storage device 64 while the data migration or pulling is ongoing. Code may be executed and stored within the storage device 64 for processing incoming read requests from the host 62. When the storage device 64 receives a request to perform a read operation and the data has not yet been migrated from the storage device 66 to the storage device 64, the data is migrated prior to completing the read operation. After the data is migrated, code in the storage device 64 sets a corresponding one or more bits in the migration bitmap. Additionally, code may be executed within the storage device which determines if an incoming data request is for a write operation. If so, and the data has not yet been migrated from the storage device 66 to the storage device 64, the data is first migrated from the storage device 66 to the storage device 64 and the corresponding migration bitmap entries are updated. Following that the write operation is subsequently applied and the corresponding one or more bits in the change bitmap are also set in accordance with the write operation.

At some point later in time, the data copying or migration from the storage device 66 to the storage device 64 may be complete, in which case the change bitmap indicates the changes or writes that have been performed by the host 62 with respect to the point in time copy of the data from the storage device 66. It may be desirable at yet a later point in time to restore the storage device 64 (or a portion thereof) to its state when the point in time copy of data from the storage device 66 was initiated. In such a case, changes indicated by the change bitmap may be reversed. Rather than make another complete copy and migrate all of the data once again from the storage device 66 to the storage device 64, the change bitmap may be used for migration to indicate the particular tracks which are to be copies from the storage device 66 to the storage device 64 to restore the storage device 64 to its state at a particular point in time. Each data portion (e.g., track) having an entry in the change bitmap indicating that the data portion has changed is copied from the storage device 66 to the storage device. Thus, the change bitmap is used as a migration bitmap as part of an efficient data restoration technique to restore a storage device or devices to a particular point in time copy. It should also be noted that the change bitmap may also be used to indicate portions of data at the storage device 66 that are to be updated (copied) to the storage device 66 to synchronize the data at the storage device 66 to be a copy of the data at the storage device 64.

The following describes restoration and synchronization using the migration and change bitmaps.

Figure 12:
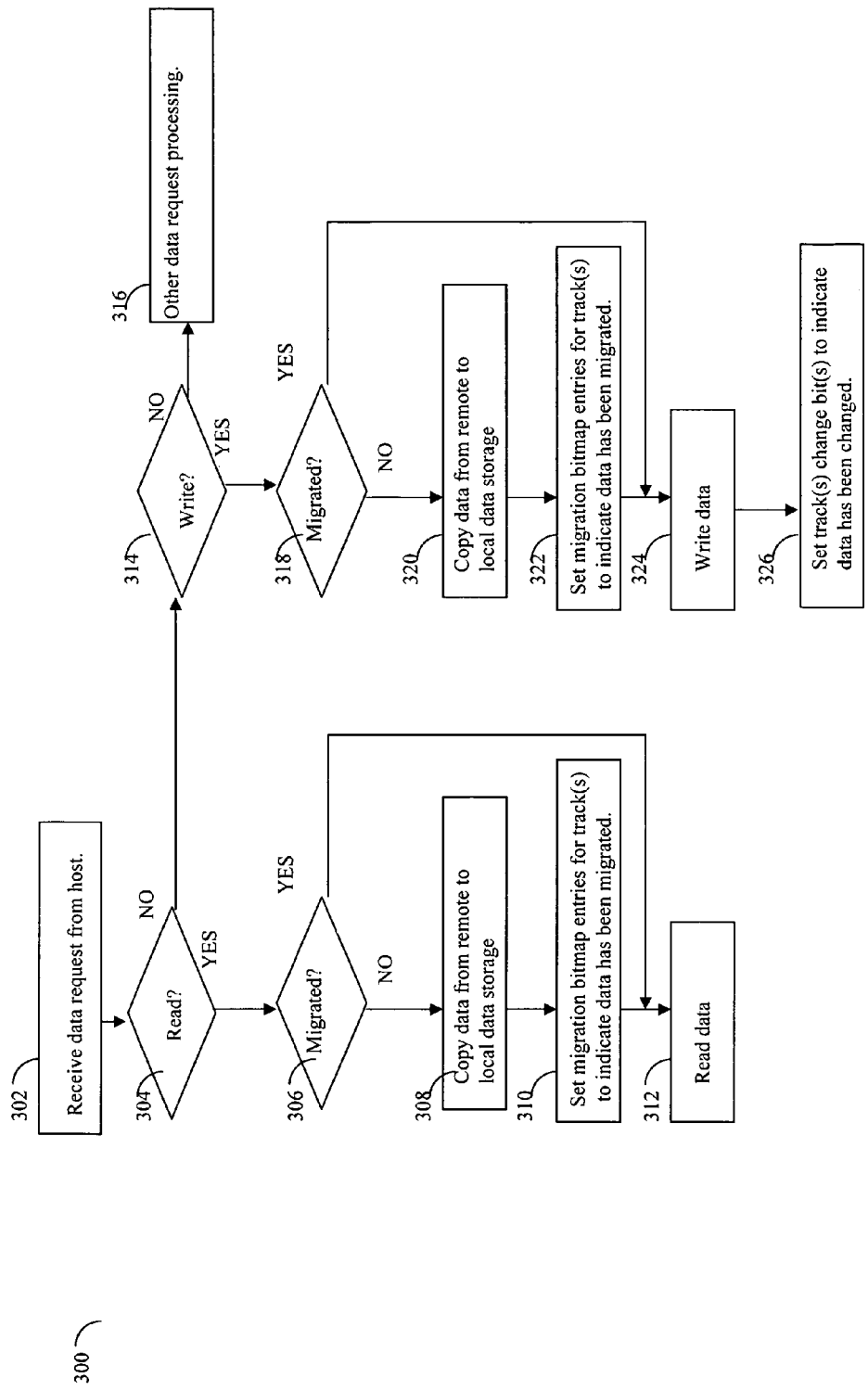
FIG. 12 is a flowchart of processing steps of one embodiment for processing a data request using the change and migration bitmaps.

Referring to FIG. 12, a flowchart 300 illustrates processing for a pull operation that may be performed using a migration bitmap and change bitmap. Processing begins at a step 302 where a data operation request is received from a host (e.g., the host 62 provides the storage device 64 with a data operation). Following the step 302 is a step 304 where a determination is made as to whether the operation is a read operation. If so, then control transfers to a step 306 to further determine if the data associated with the read operation has been migrated. If so, then control transfers to a step 312 to read the data. Otherwise, control transfers to a step 308 to copy data from the storage device 66 to the storage device 64. Following the step 308 is a step 310 where appropriate migration bit(s) of the copied tracks are set to indicate that the data has been migrated. Following the step 310 is the step 312, discussed above.

If it is determined at the step 304 that the requested operation is not a read operation, then control transfers from the step 304 to a step 314 to determine if the data request is for a write operation. If not, then control transfers to a step 316 to perform the requested operation. Otherwise, control transfers to a step 318 to determine if the destination of the write operation has already had corresponding data migrated from the storage device 66 to the storage device 64. If so, control transfers to a step 324 where the write operation is performed. Following the step 324 is a step 326 where appropriate change bit(s) in the change bitmap are set.

If it is determined at the step 318 that the data has not yet been migrated, then control transfers from the step 318 to a step 320 where the data is copied from the storage device 66 to the storage device 64. Following the step 320 is a step 322 where appropriate migration bitmap entries are set to indicate the tracks of data that have been migrated. Following the step 322 are the steps 324, 326, discussed above.

The processing illustrated by the flowchart 300 provide for copying data from a remote data storage system to a local data storage system such that the local data storage system has appropriate records for a point in time copy of the remote data storage system with any additional write requests issued by the host applied to the particular point in time copy of data. The additional write requests with respect to the point in time copy of data are recorded in the change bitmap. In the event that it is desirable to restore the local data storage system to the remote data storage system point in time copy, the change bitmap may be used for migration to indicate the particular tracks of data (or other portions of data) which need to be copied from the remote data storage system to the local data storage system.

The change bitmap may also be used to provide an incremental backup of the local data storage system to the remote data storage system. Elements of the change bitmap indicate the tracks (or other appropriate portions of data) which are to be copied from the local data storage system to the remote data storage system to synchronize the remote data storage system with the local data storage system.

Figure 13:
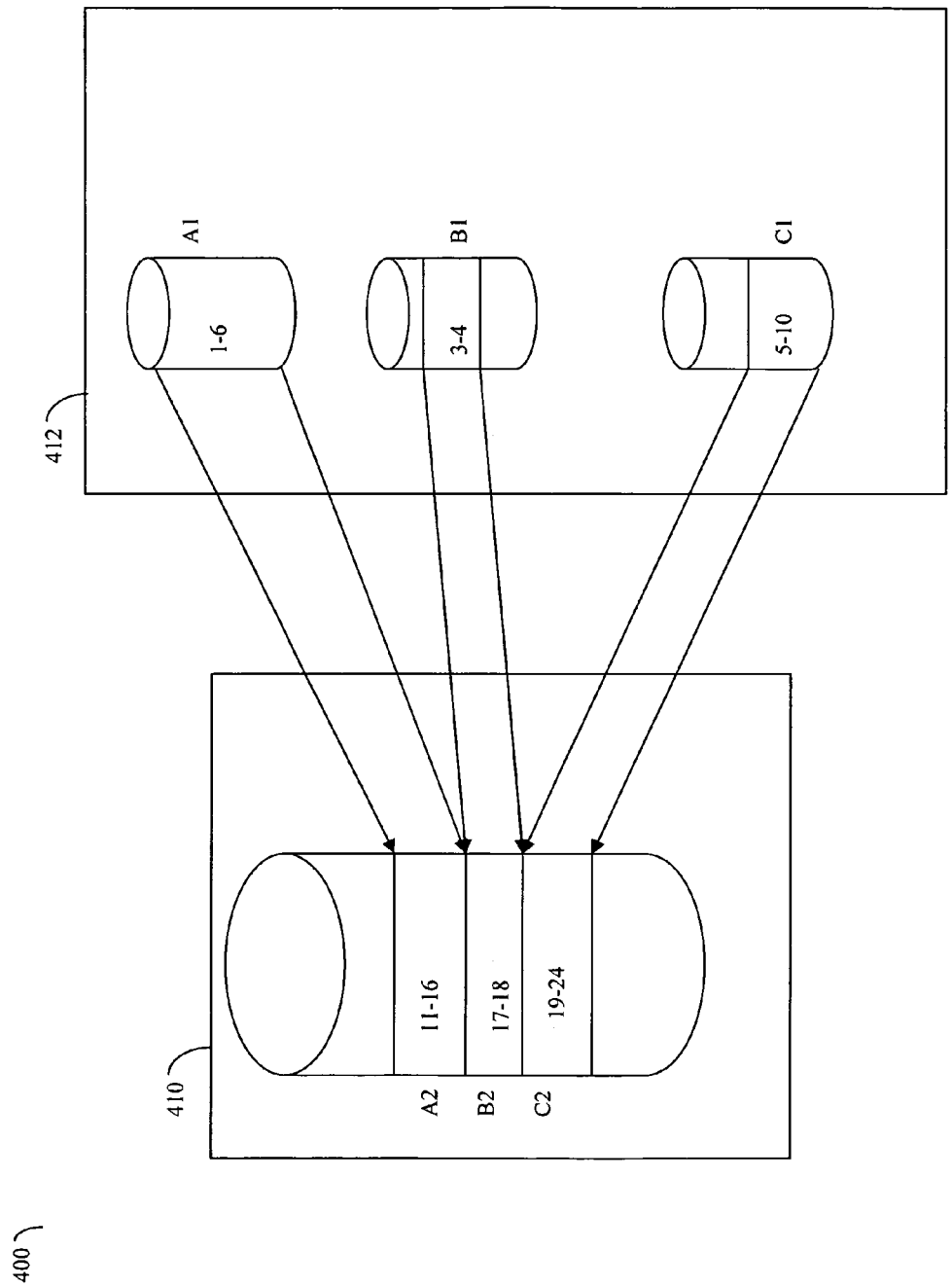
FIG. 13 is an example illustrating use of multiple source devices with a single target device for data migration with multiple sessions.

Referring to FIG. 13, a diagram 400 illustrates a source data storage system 410 and a destination data storage system 412 in which there are multiple data pull sessions from the data storage system 412 to the data storage system 410. In this example, the data storage system 410 may be the destination data storage system for migrating data from corresponding portions of multiple data storage devices (A1, B1, C1) that are part of the source data storage system 412. In this example, an entire data portion of device A1 is migrated to the data storage system 410 having a corresponding portion A2 in a first pull session. A portion of device B1 is migrated to the data storage system 410 having a corresponding device portion B2 in a second pull session. The corresponding portion of device C1 is migrated from the data storage system 412 to the data storage system 410 have a corresponding portion C2 in a third pull session. The data migration for copying operations may gather data from all or portions of one or more devices as illustrated by the diagram 400. Data from separate sources may be concatenated into a single continuous data portion.

The techniques described herein using the migration and the change bitmap may be used in connection with performing an incremental backup.

Figure 14:
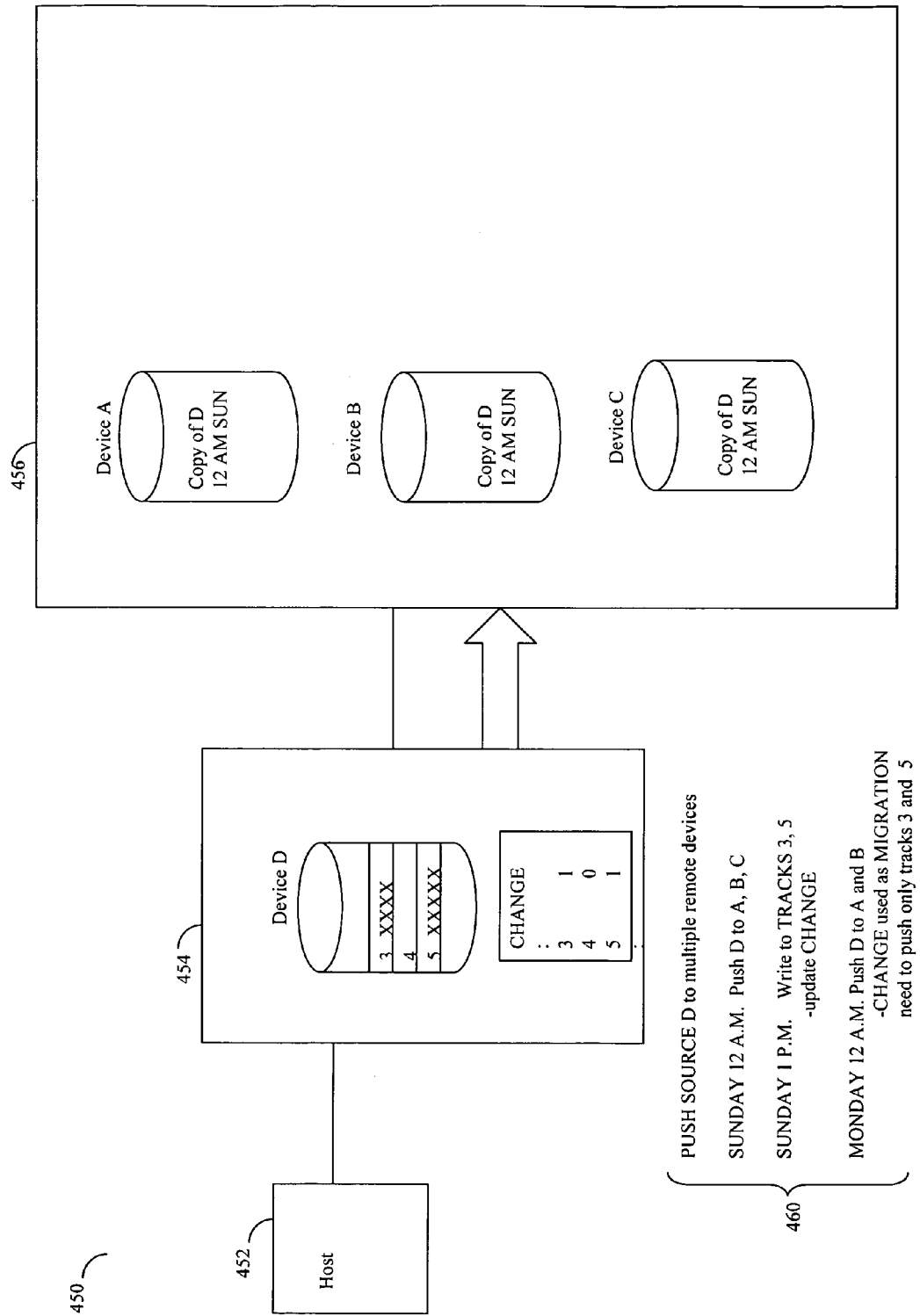
FIGS. 14 and 15 are other examples of systems that may be used in connection with the migration techniques described herein.

Referring to FIG. 14, a system 450 includes a host 452, a local data storage system 454 and a remote data storage system 456. An item 460 illustrates processing that may be performed by the system 450. In this example, on Sunday at 12:00 a.m., a backup is performed of the local data storage device D in triplicate such that device D has its data pushed to devices A, B and C within the data storage system 456. This may be performed using the processing steps associated with the copying or migration operation as described elsewhere herein. Subsequently, at 1:00 p.m. on Sunday, a write operation is issued from host 452 and received at the data storage system 454 requesting a write to tracks three and five of device D. A change bitmap is maintained within the data storage system 454 and the corresponding portions of change bitmap are updated to indicate that a write has been performed to tracks three and five. Subsequently, a second differential backup may be made on Monday at 12:00 a.m. where the contents of device D are pushed this time only to devices A and B. In this example, Sunday is a relatively slow day as indicated by change bitmap of 454 showing only tracks three and five have changed.

In connection with performing this incremental backup Monday at 12:00 a.m. of device D to devices A and B of the remote storage system 456, the change bitmap of 454 may be used to indicate which data needs to be moved. Accordingly, devices A and B may be updated to the point in time copy of Monday at 12:00 a.m. by only pushing tracks three and five from device D to devices A and B of the data storage system 456 as indicated by the "1" entries in the change bitmap of 454.

The foregoing illustrates the use of change bitmap for performing an incremental backup with respect to a prior point in time copy. It should be noted that multiple change bitmaps may be used to represent a change status at multiple corresponding points in times with respect to a point in time copy. For example, a second change bitmap may be used to represent the changes made with respect to device C.

As described elsewhere herein in connection with use of the migration bitmap, the migration bitmap and the change bitmap may also be used where both the source and the destination devices associated with the data migration are available online for use by hosts.

Figure 15:
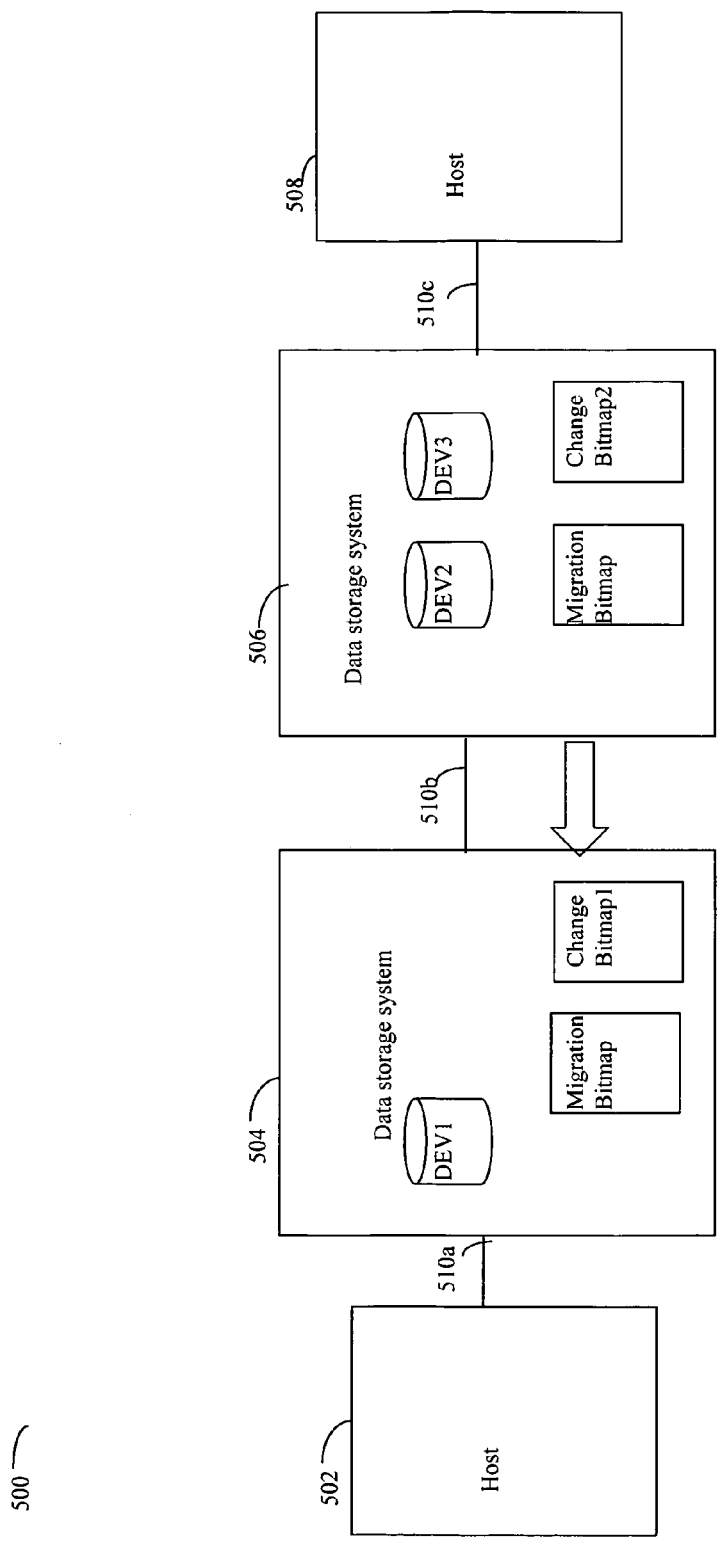

Referring to FIG. 15, a system 500 may be used in connection with performing an online data migration where both the source and the destination data storage systems associated with the data migration are available online. Note that although the example of FIG. 15 shows data being pulled from a data storage system 506 to a data storage system 504, the mechanism described herein may also be easily adapted to be used in connection with performing a data push operation. In this example, the migration bitmaps maintained by the data storage systems 504, 506 are synchronized and indicate the status of the migration of data for one or more devices (e.g., logical devices) of the data storage system 506 to one or more devices of the data storage system 504. Any one of a variety different techniques may be used to synchronize access to the bitmaps. For example, in one embodiment, a task executing on one of the data storage systems 504, 506 updates both bitmaps on both data storage systems 504, 506 by obtaining locks on all portions of the bitmaps needed to perform the updates.

Figure 16:
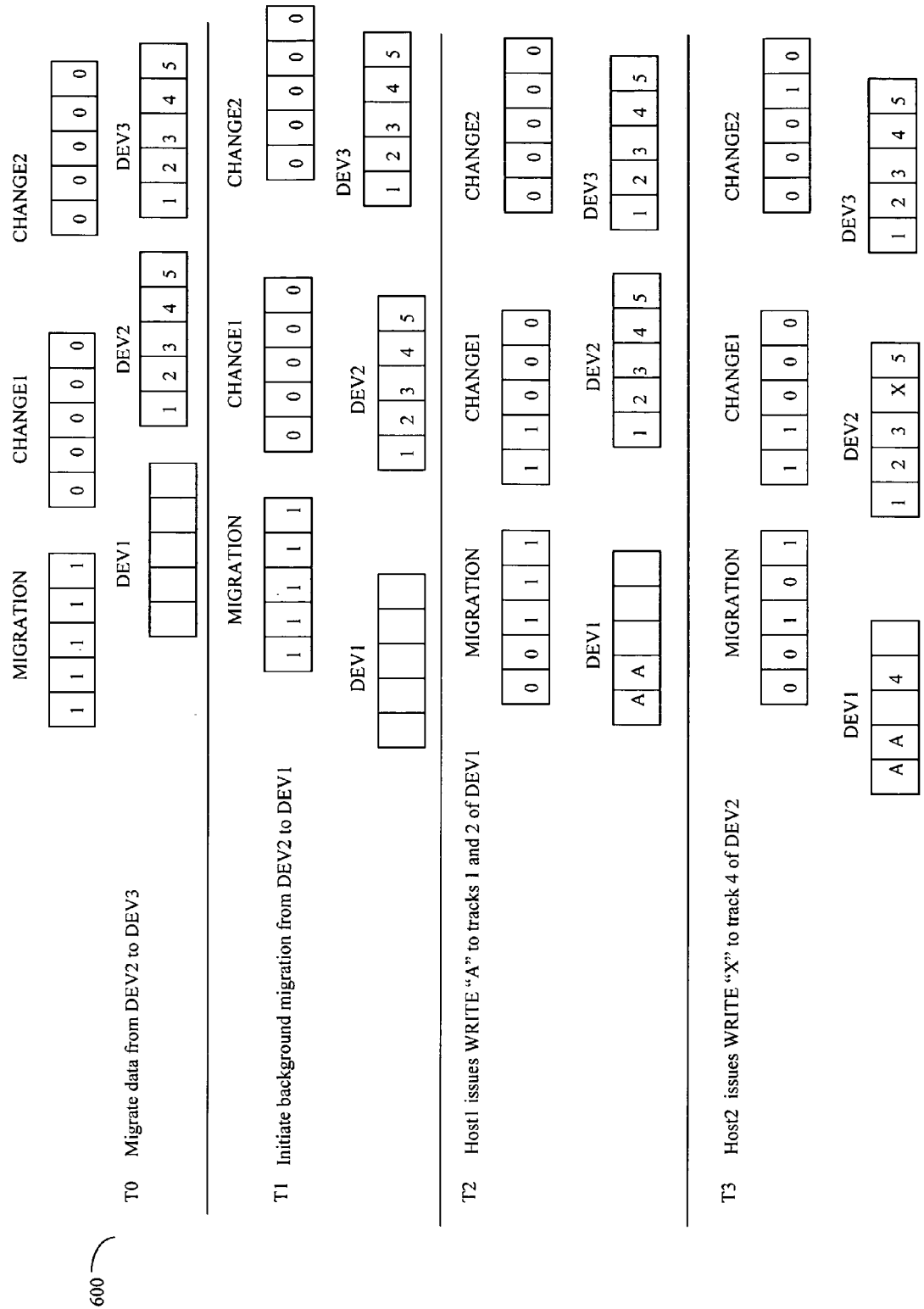
FIGS. 16 and 17 illustrate the state of different data elements at various points in time of a data migration.
Figure 17:
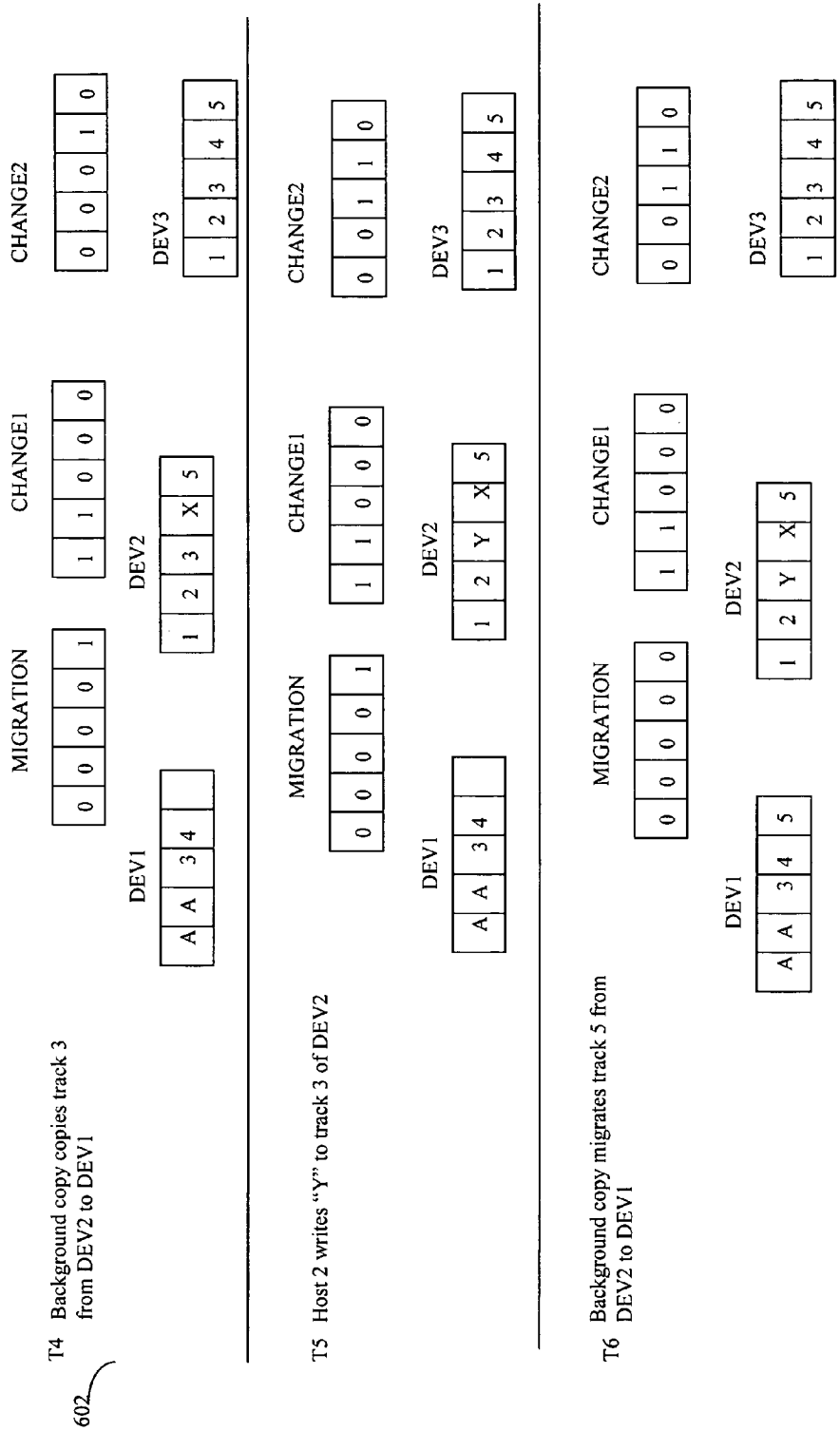

Referring to FIGS. 15, 16 and 17, various operations result in the state of the migration bitmap, change bitmap and content of a particular device within the data storage system 506 being migrated to the data storage system 504. DEV 2 and DEV3 correspond to devices included within data storage system 506 while DEV 1 corresponds to a device included within data storage system 504. In FIGS. 16 and 17, the left side indicates a processing step and a state variable for a corresponding data element in the right hand portion. In FIGS. 16 and 17, an element labeled MIGRATION represents a state of both the MIGRATION1 and MIGRATION2 bitmaps of FIG. 15 as maintained on the two different storage systems. In this example, the contents of MIGRATION1 and MIGRATION2 are synchronized to include the same representation during operation.

At a time T0, a complete copy of DEV2 may be made on DEV3. At some point later at a time T1, a migration task is initiated to begin pulling data from DEV 2 to DEV 1. Immediately after the copying task is initiated at the step T1, no data has yet been migrated and no data operations are received by either data storage system. Any necessary code on the data storage system 506 for processing incoming I/O requests is also initialized. At a second time T2, the host 502 issues a write of the letter A to tracks one and two of DEV 1. As indicated by the data element associated with T2, DEV 1 has its content updated for tracks one and two, and the change bitmap 1 has entries one and two corresponding to tracks one and two of DEV1 also updated. Using the techniques described herein, the migration bitmap as maintained by both the data storage system 504, 506 has a first and second element with a value of zero with the remaining elements having a value of one indicating that tracks one and two have been migrated from DEV 2 to DEV 1. At a later time T3, the host 508 may issue a write of the value of X to track four on DEV2. In this instance, the data storage system 506 performs processing to migrate track four from DEV2 to DEV1 prior to performing a write of the value of X to track four on DEV 2. The fourth entry of the change bitmap2 is updated to indicate writing data to the fourth track. Additionally, the migration bitmap (on both the data storage systems 504, 506) has a corresponding fourth entry updated to indicate that track four has been migrated from DEV 2 to DEV 1. At a later time T4, a copy task (for pulling data) executing on the system 504 copies track three from DEV 2 to DEV 1. The migration bit vector has the third entry corresponding to track three set to zero to indicate that the migration of data from DEV 2 to DEV 1 has been completed for track three. The data migration of track three from DEV 2 to DEV 1 results in an original value of three being copied from track three of DEV 2 to track three of DEV 1, as indicated by the elements associated with the step T4. At a step T5, the host 508 then writes a value of Y to track three on DEV 2, which is indicated by setting the third element of the change bitmap 2 to one, and setting a corresponding entry for track three of DEV 2 to Y. At a step T6, the copy task completes the migration by migrating data for all remaining tracks (track five in this example) from DEV 2 to DEV 1. This results in data being copied as from the fifth element of DEV2 to the fifth element of DEV1 and the fifth element of the migration bitmap set to zero.

The change bitmap 1 indicates changes that have been made by the host 502 to DEV 1 with respect to the point in time copy of DEV 2 at T1. The point in time copy resides on DEV3. Similarly, the change bitmap 2 indicates changes that have been made to DEV 2 with respect to the point in time copy of DEV 2 at time T1. Previously, at a time T0, a first backup copy of DEV 2 was made on DEV 3. A copy of DEV 3 may be synchronized to be like that of DEV 1 by using the change bitmap 1 as the migration bitmap indicating those values to be migrated to DEV 3 to synchronize DEV 3 with the copy of the data on DEV 1. Similarly, the change bitmap 2 may be used as the migration bitmap in order to synchronize the contents of DEV 3 to be like that of DEV 2. Wherever there is an appropriate indicator in the change bitmap 2, the corresponding data track may be migrated from DEV 2 to DEV 3 such that DEV 3 and DEV 2 are synchronized. The foregoing are a few of many possible examples of how the change and migration bit vectors may be used in connection with online data copying.

In instances where multiple devices are coupled to a port, it may be desirable to control an amount of relative communication bandwidth allocated to each device so that background processes, such as the data migration processes described herein, do not "starve" foreground processes such as host I/O requests. It may be desirable to provide foreground processes with a sufficient amount of port bandwidth to ensure proper operation by imposing a ceiling on a total amount of port communication bandwidth allowed for use background processes. In an embodiment herein, each of the ports such as, for example, the FA 68 of FIG. 3, includes software that manages the port to provide a bandwidth ceiling for background processes. Of course, other embodiments are possible, including embodiments where the bandwidth ceiling for background processes is provided by hardware or a combination of hardware and software at the FA 68 (or equivalent) or at any other appropriate location of the storage device or distributed throughout the storage device.

The system described herein uses a mechanism to control the maximum amount of bandwidth (maximum throughput) for background processes using a port where a value is set for a minimum delay between each background process I/O operation. Following a background process I/O operation, a next background process I/O operation may not be performed until at least an amount of time corresponding to the minimum delay has passed. During the delay between background process I/O operations, foreground process such as processes that service host requests may use the port for I/O operations. The minimum delay may be adjusted during runtime depending upon whether the actual throughput of I/O for the background processes is over or under a selected maximum throughput.

Figure 18:
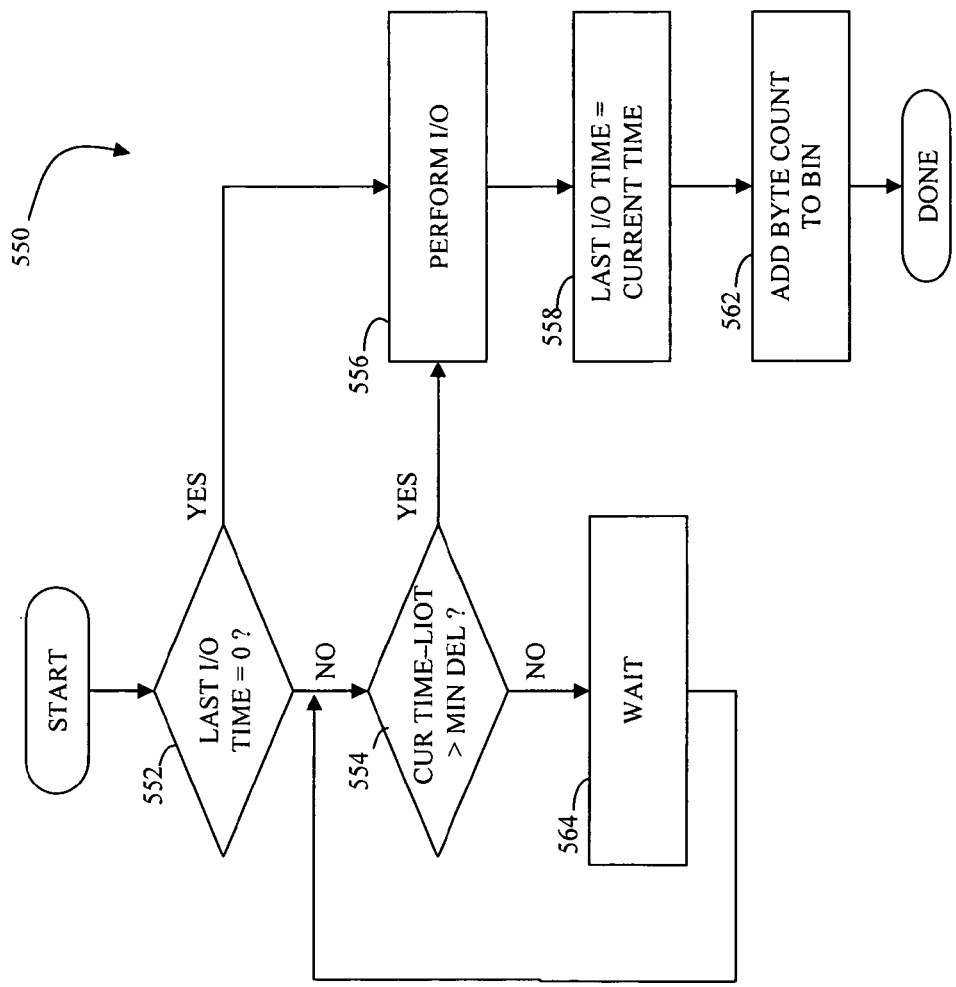
FIG. 18 is a flow chart illustrating handling an I/O operation for a background task when port ceiling functionality is operating according to the system described herein.

Referring to FIG. 18, a flow chart 550 illustrates steps performed in connection with servicing I/O operations for a background process at a port. Processing begins at a first test step 552 where it is determined if the last I/O time (LIOT) for an I/O associated with a background process I/O is set to a value of zero. In an embodiment herein, a variable corresponding to the last I/O time of a background process I/O is set to zero upon initialization of the system. In such a case, the last I/O time will be zero in connection with performing the first I/O for the system. If it is determined at the test step 552 that the last I/O time is not zero, then the control passes from the test step 552 to a test step 554 where it is determined if the difference between the current time and the last I/O time is greater than a minimum delay value that corresponds to the minimum amount of time between I/O operations for background processes. If so, then control passes from the test step 554 to a step 556 where the I/O operation is performed.

Following the step 556 is a step 558 where a variable corresponding to the last I/O time (LIOT) is set to the current time. Following the step 558 is a step 562 where the number of bytes that were transferred in connection with the I/O operation at the step 556 are added to a bin that keeps track of the amount of data actually transmitted within a particular time frame. Keeping track of an amount of data transmitted and uses thereof are both described in more detail hereinafter. Following the step 562, processing is complete.

If it is determined at the test step 554 that the difference between the current time and the last I/O time is not greater than the minimum delay time, then controlled transfers from the test step 554 to a step 564 when the wait processing is performed to wait for more time to pass. Note that while the process is waiting at the step 564, it is possible for other processes, such as foreground processes servicing hosts coupled to the port, to perform I/O operations at the port. The amount of time for the wait at the step 564 may be set to any appropriate value, such as the value of the minimum delay time or some fraction thereof. Following the step 564, control transfers back to the test step 554, discussed above.

Figure 19:
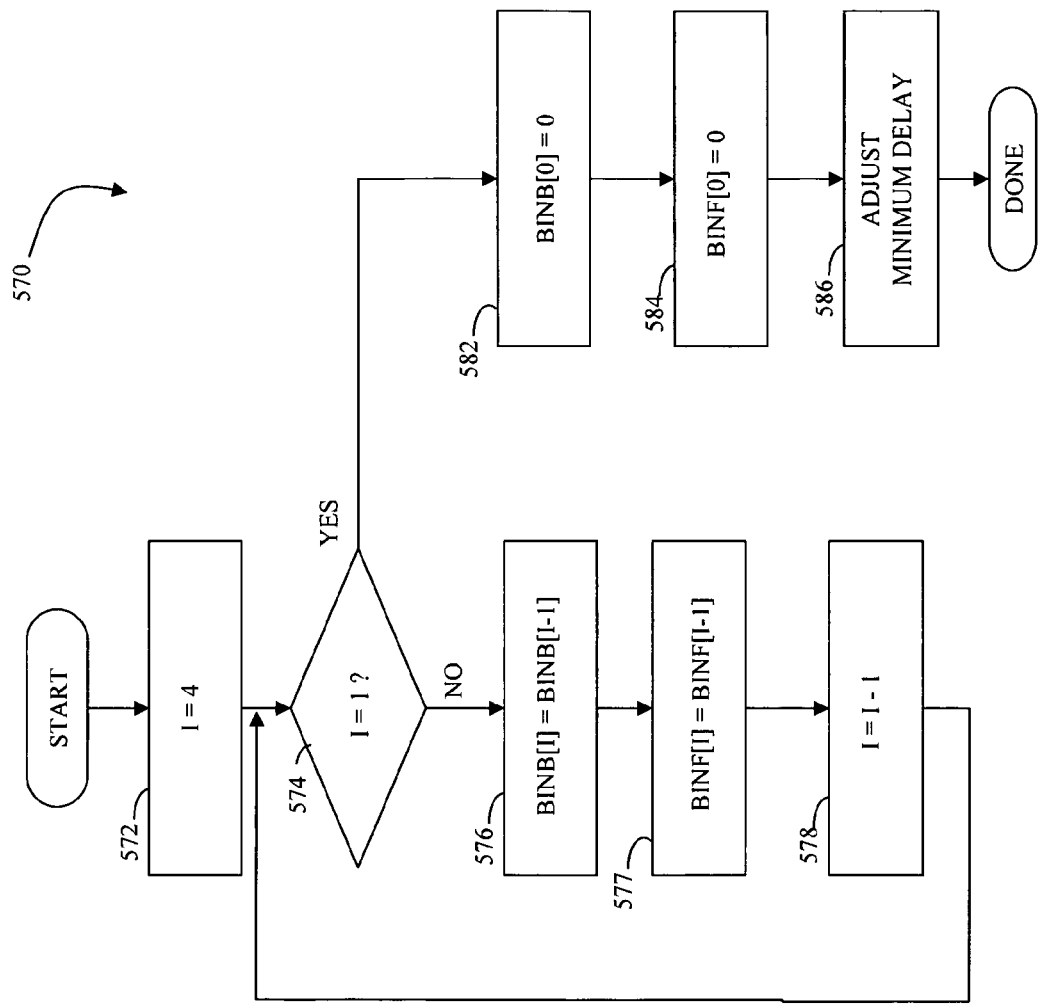
FIG. 19 is a flow chart illustrating processing performed periodically to update performance data and adjusting a minimum delay according to the system described herein.

Referring to FIG. 19, a flowchart 570 illustrates steps performed periodically to adjust data for the ports and to adjust the minimum delay value. Processing begins at a first step 572 were an index variable, I, is set to four. Following the step 572 is a test step 574 which determines if the index variable equals one, indicating no more iterations are to be performed. If not, then control transfers from the test step 574 to a step 576 where binb[I] is set equal to binb[I-1]. Following the step 576 is a step 577 where binf[I] is set equal to binf[I-1]. In an embodiment herein, four bins are used to keep track of data transmitted for background processes (binb) and four other bins are used to keep track of data transmitted for foreground processes (binf). Use of the bins is discussed in more detail hereinafter. Note, however, that the bin to which data is added at the step 562 of the flowchart 550 of FIG. 18 is binb[0]. Following the step 577 is a step 578 where the index variable is decremented. Following this step 578, control transfers back to the test step 574, discussed above.

If it is determined at the test at 574 that the index variable equals one, then control transfers from the test step 574 to a step 582 where binb[0] is set equal to zero to facilitate collection of new data in binb[0]. Following the step 582 is a step 584 where binf[0] is set equal to zero. Following the step 584 is a step 586 where the minimum delay is adjusted. Adjusting the minimum delay at the step 586 is discussed in more detail hereinafter. Following the step 586, processing is complete. Note that data is accumulated in binb[0] for background processes and binf[0] for foreground processes as I/O operations are performed.

In an embodiment herein, the processing illustrated by the flowchart 570 is performed every four seconds so that each bin represents four seconds worth of data. Of course, it is possible to perform the processing illustrated by the flowchart 570 in periodic increments greater than or less than four seconds. It may also be possible to dynamically adjust the amount of time for the periodic increments.

Figure 20:
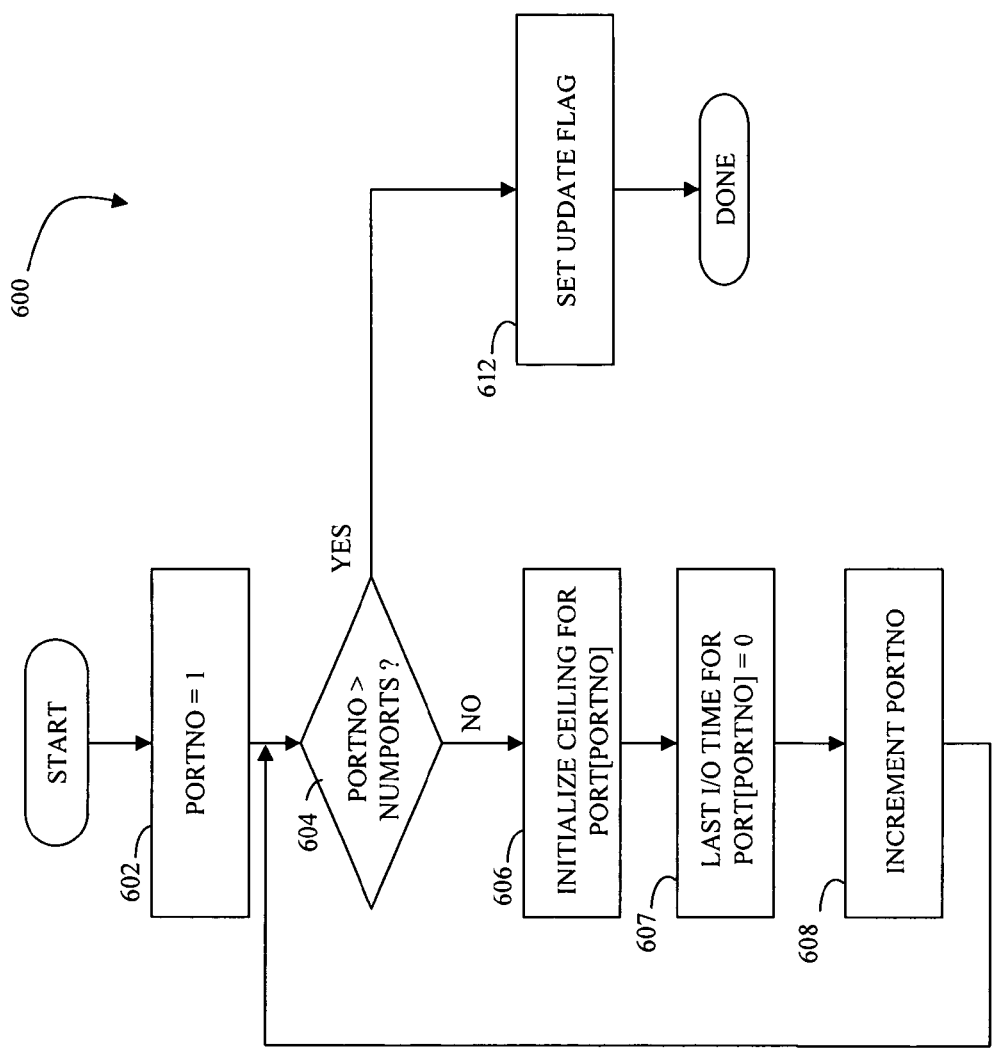
FIG. 20 is a flowchart illustrating initializing ports according to the system described herein.

Referring to FIG. 20, a flowchart 600 illustrates steps performed in connection with initializing ports to provide the port ceiling processing described herein. Processing begins at a first step 602 where an index variable, portno, is set equal to one. The index variable is used to iterate through all of the ports of the system. Following the step 602 is a test step 604 where it is determined if the index variable equals the number of ports. If not, then control transfers from the test step 604 to a step 606 where a particular port indexed by the index variable is initialized. Initializing ports at the step 606 is discussed in more detail hereinafter.

Following the step 606 is a step 607 where the last I/O time variable (LIOT) for the port indicated by the index variable is set equal to zero. As discussed elsewhere herein, the last I/O time variable being set to zero indicates that the port has just been initialized and no I/O operations have yet been performed at the port. Following the step 607 is a step 608 where the index variable is incremented. Following the step 608, control transfers back to the step 604, discussed above.

Once it is determined at the test step 604 that the index variable exceeds the number of ports, then control transfers from the test step 604 to a step 612 were an update flag is set to cause the processing illustrated by the flowchart 570 of FIG. 19 to be performed. Following the step 612, processing is complete.

Figure 21:
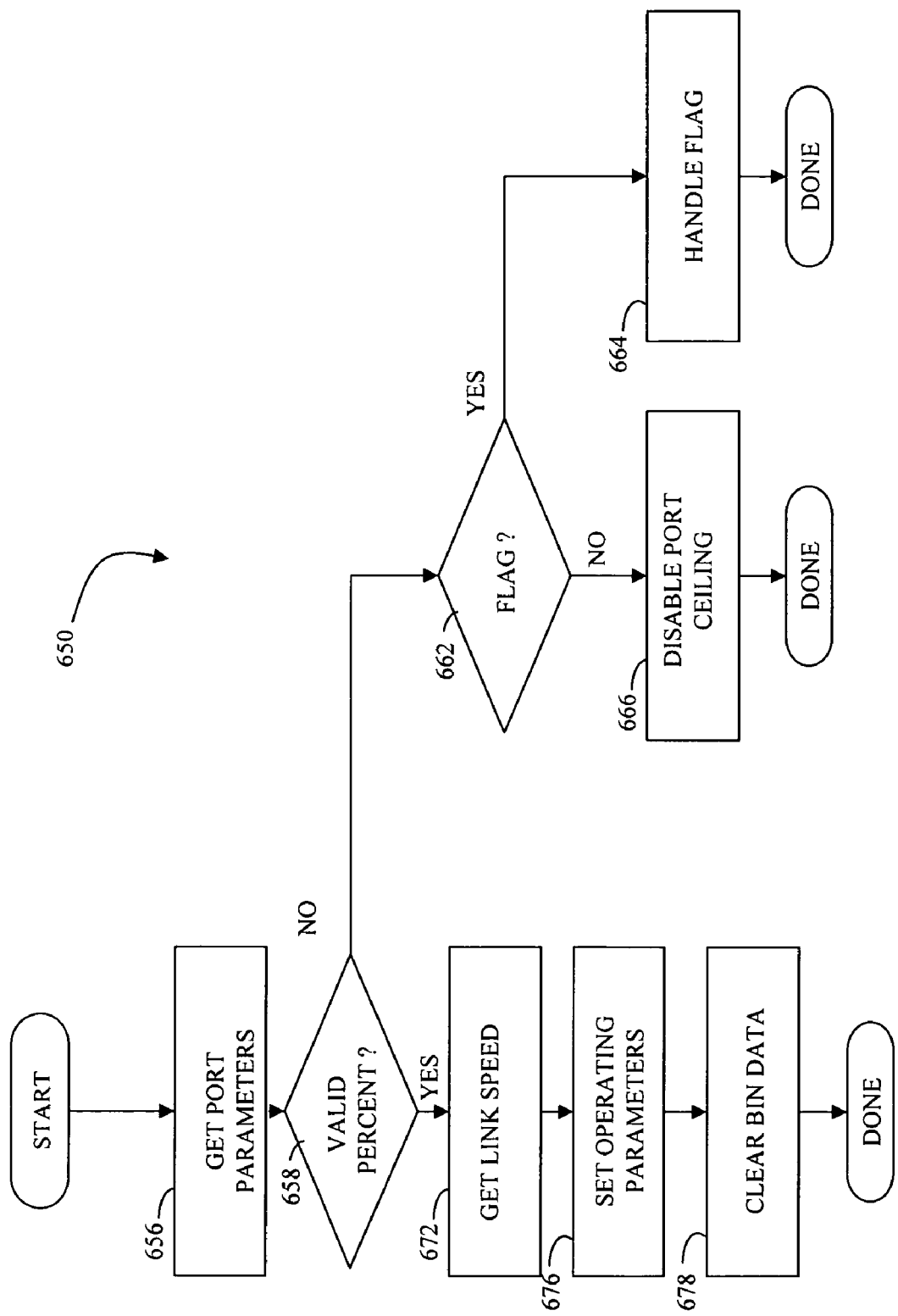
FIG. 21 is a flow chart illustrating initializing ceiling information for ports according to the system described herein.

Referring to FIG. 21, a flowchart 650 illustrates steps performed in connection with initializing the ports at the step 606 of the flowchart 600 of FIG. 20. Processing begins at a first step 656 where port data is obtained. The port data includes the desired percent of bandwidth for background processes requested by the user. Following the step 656 is a test step 658 where it is determined if the desired percent bandwidth for the port obtained at the step 656 is valid (i.e., between 0% and 100%). If not, then control transfers from the test step 658 to a test step 662 where it is determined if the value for the percent is a flag. In an embodiment herein, specific values for the percent may be used as flags indicating other operations to be performed. For example, the percent may be set to 255 as a flag indicating that the port variables are not to be updated.

If it is determined at the test step 662 that the particular value for percent for the port is a flag, then control transfers from the test step 662 to a step 664 where the flag is handled. At the step 664, whatever processing appropriate to the flag is performed. Following the step 664, processing is complete. If it is determined at the test step 662 that the percent bandwidth requested for the port is not a flag, then control transfers from the test step 662 to a step 666 where ceiling processing for the port is disabled. Ceiling processing may be disabled by, for example, setting the minimum delay to zero. Thus, the step 666 is reached if the desired percent requested for the port is not between zero and one hundred and does not indicate a flag value. Following the step 666, processing is complete.

If it is determined at the test at 658 that the desired percent for the port is a valid percent (e.g., between zero and one hundred), then control passes from the test step 658 to a step 672 where the link speed for the port is obtained. The links speed for a particular port may be hardcoded and is simply the actual throughput for the port. The actual throughput depends upon the maximum throughput and I/O overhead for the port. Thus, a developer and/or a user may hardcode a specific link speed for a port based on empirical observation of the port or of similar ports.

Following steps 672 is a step 676 where the operation variables for the port are set. The operation variables set at the step 676 include, for example, the minimum delay. In an embodiment herein, the initial minimum delay may be calculated at the step 676 by dividing the amount of data that is sent in a single I/O operation by the actual throughput of the port and multiplying the result thereof by the desired percentage. Thus, for example, if the actual throughput of the port is 80 MB per second and the user requests a ceiling of 30% for background processes, and each I/O operation sends 64 kB of data, then the initial minimum delay calculation at the step 676 would be:

$$1 \text{ sec}/((80 \text{ MB}*0.30)/64 \text{ KB}) = 2666 \text{ usec}$$

Note that the amount of data sent for each I/O operation may be fixed for a particular system (e.g., 64k or 32k) or may be variable. In some embodiments, it may be possible to maintain statistics of an amount of data sent for each I/O operation and use, for example, an average value for the calculation above and/or similar determinations.

Following the step 676 is a step 678 where performance data for the port is cleared. The performance data cleared at the step 678 includes, for example, the bins, which are all set to zero at the step 678. Following the step 678, processing is complete.

Figure 22:
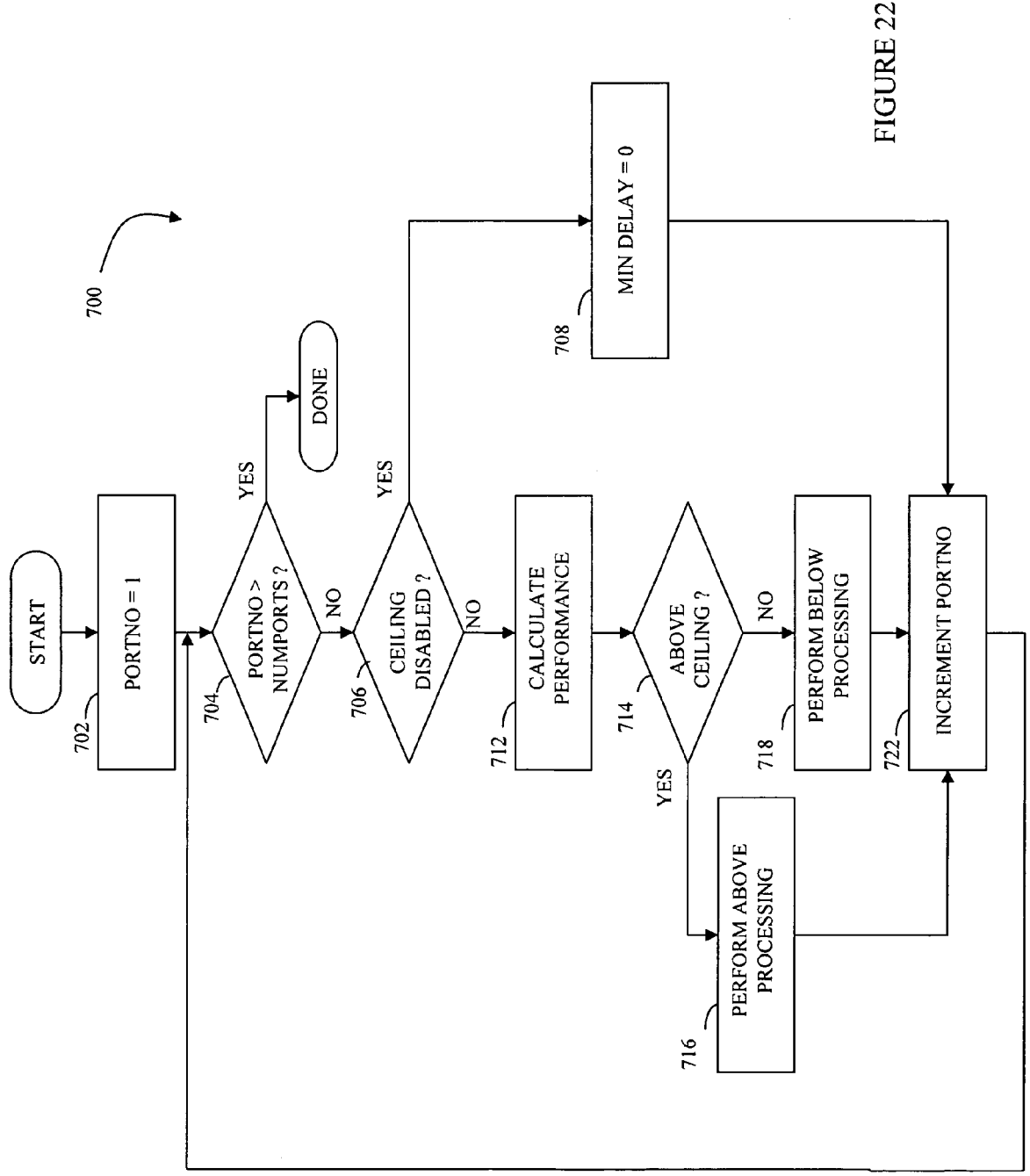
FIG. 22 is a flowchart illustrating adjusting a minimum delay for ports according to the system described herein.

Referring to FIG. 22, a flowchart 700 illustrates processing performed in connection with the step 586 of the flowchart 570 of FIG. 19 where the minimum delay is adjusted. Processing begins at a first step 702 where an index variable, portno, is set equal to one. The index variable is used to iterate through the ports. Following the step 702 is a step 704 where it is determined if the index variable is greater than the number of ports. If so, then processing is complete. Otherwise, control transfers from the test step 704 to a test step 706 where it is determined if the particular port being processed has the background ceiling function disabled. It is possible to have some ports use the background ceiling functionality described herein while other ports do not.

The test at the step 706 may be performed by, for example, determining if the percent set for the port is a valid percentage or a flag value. If it is determined at the test step 706 that the port is disabled, then control transfers from the test step 706 to a step 708 where the minimum delay for the port is set to zero thus, in effect, causing there to be no delay between background I/O operations.

If it is determined at the test step 706 that the port is not disabled, then control transfers from the test step 706 to a step 712 where performance parameters for the port are calculated. The performance parameters calculated at the step 712 include the actual throughput of the background processes and the actual throughput of the foreground processes. Note that throughput may be determined at the step 712 using the data in the bins and knowing the amount of time between iterations when data is collected in the bins. Since an appropriate one of the bins is incremented each time data is sent, it is a straightforward calculation to use the value of the bins and the amount of time used to collect the data in the bins to determine the actual throughput associated with background and foreground processes for any quantum of time for which bin data exists. In an embodiment herein, there are four bins for foreground processes and four bins for background processing and each bin represents an amount of data sent in four seconds.

Following the step 712 is a test step 714 where it is determined if the throughput for background processes calculated at the step 712 is above the desired ceiling bandwidth for the port. If so, then control transfers from the test step 714 to a step 716 to perform specific processing for when the actual I/O throughput for background processes exceeds the desired throughput. Otherwise, control transfers from the test step 714 to a step 718 for specific processing that is performed when the actual I/O throughput of background processes for the port are below the desired throughput. Processing performed at the step 716 and at the step 718 is described in more detail hereinafter.

Following the step 716, the step 718, and the step 708 is a step 722 where the index variable used to iterate through the ports is incremented. Following the step 722, control transfers back to the step 704, discussed above.

In some embodiments, it may be desirable to forego the processing at the steps 716, 718 if there is not enough performance data available (e.g., because the system just initialized). In an embodiment herein, the minimum delay is maintained at the value calculated at the step 676 until at least eight seconds (or sixteen seconds) worth of performance data is available for the processing at the step 716, 718 to adjust the minimum delay.

Figure 23:
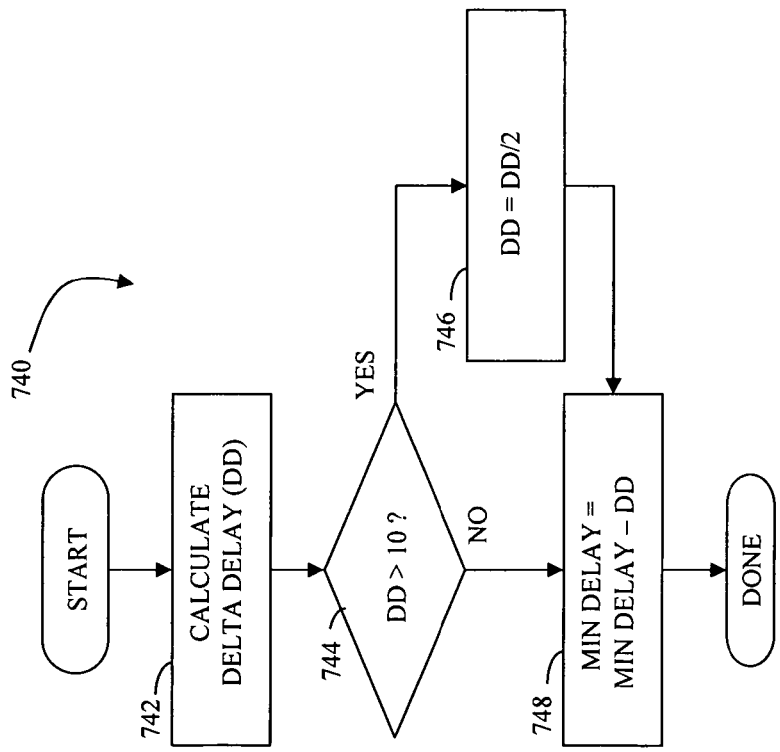
FIG. 23 is a flowchart illustrating processing performed in connection with decreasing a minimum delay for a port ceiling according to the system described herein.

Referring to FIG. 23, a flow chart 740 illustrates processing performed at the step 718 of the flowchart 700 of FIG. 22 to adjust the minimum delay when the actual throughput of the background processes for the port are below the desired throughput. Note that, generally, having the actual throughput be below the desired throughput may be corrected by decreasing the minimum delay.

Processing begins at a step 742 where a delta delay value is calculated. The delta delay value calculated at the step 742 may be an amount by which the minimum delay should be modified in order to cause the actual throughput to be closer to the desired throughput. In an embodiment herein, the delta delay value is calculated at the step 742 by subtracting the actual throughput from the desired throughput and then scaling the result thereof according to the desired throughput. For example, the delta delay value may be calculated using the following:

delta delay=MD*(DT−AT)/DT where MD=the current value of the minimum delay, DT=desired throughput, and AT=actual throughput.

Following steps 742 is a test step 744 where it is determined if the value for delta delay determined at the step 742 is greater than ten µs. If so, then control transfers from the test step 744 to a step 746 where the value for delta delay is divided by two (in order to avoid rapid changes in the minimum delay value). Following the step 746, or following the test step 744 if the delta delay value is not greater than ten µs is a step 748 where the minimum delay is decreased by the delta delay value. Following the step 748, processing is complete.

Figure 24:
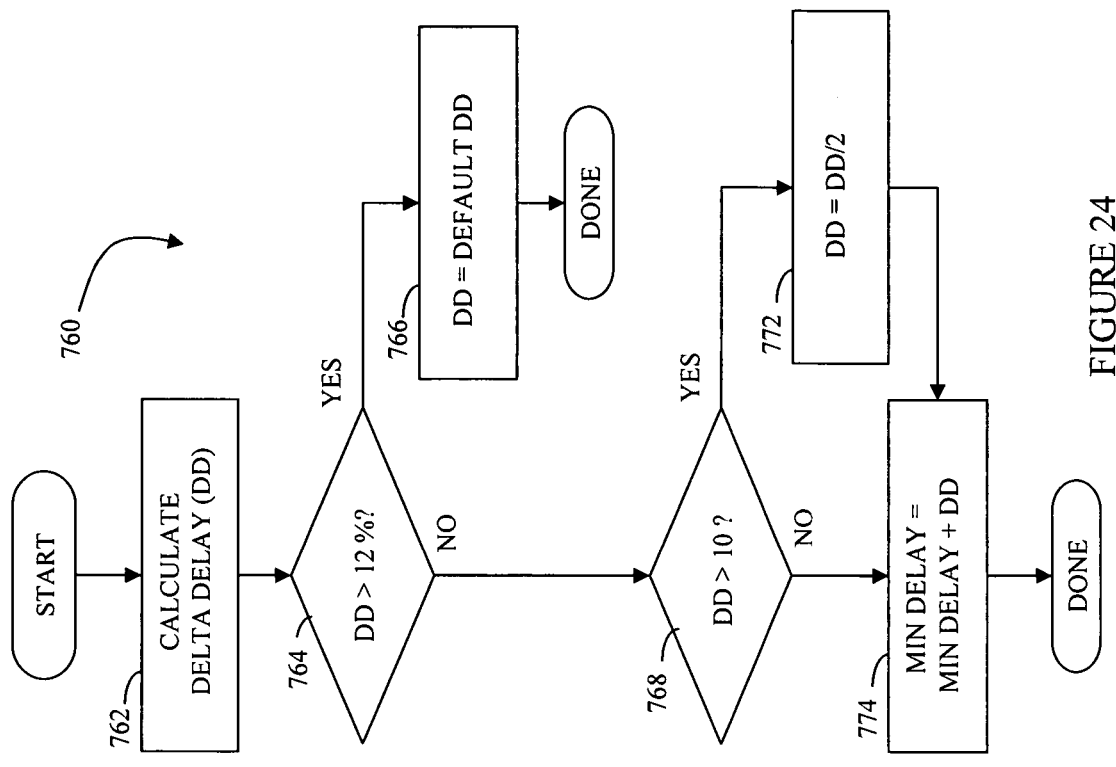
FIG. 24 is a flowchart illustrating processing performed in connection with increasing a minimum delay for a port ceiling according to the system described herein.

Referring to FIG. 24, a flow chart 760 illustrates in more detail processing performed at the step 716 of the flowchart 700 of FIG. 22 where the minimum delay value is modified when the actual throughput is above the desired throughput for the port. Note that, generally, having the actual throughput be above the desired throughput may be corrected by increasing the minimum delay.

Processing begins at a first step 762 where the delta delay value. The calculation performed at the step 762 is similar to the calculation performed at the step 742 except, in this case, the desired throughput is subtracted from the actual throughput so that the value of delta delay is positive. Following the step 762 as a test step 764 were it is determined if the value of delta delay calculated at the step 762 is greater than 12% of the desired throughput. If so, then control transfers from the test step 764 to a step 766 where the minimum delay is set equal to a default minimum delay which is determined similar to determining the initial value for the minimum delay at the step 676 of the flowchart 650 of FIG. 21, described above. Following the step 766, processing is complete.

If it is determined at the test step 764 that the calculated value for delta delay is not greater than 12% of the desired throughput, then control transfers from the test step 764 to a test step 768 where it is determined if the calculated value for delta delay is greater than ten µs. If so, then control transfers from the test step 768 to a step 772 where the value for delta delay is divided by two. Following the step 772, or following the step 768 if the value for delta delay is not greater than ten µs is a step 774 where the minimum delay incremented by the value of delta delay in order to increase the delay between background I/O operations. Following the step 774, processing is complete.

The foregoing may be used in an embodiment with standard read and write operations in order to push and/or pull data using various SCSI commands between the data storage systems using the techniques described herein. It should be noted that the particulars of the hardware and software included in each of the components that may be included in the data storage system are described herein in more detail, and may vary with each particular embodiment. Each of the host computers and one or more data storage systems may all be located at the same physical site, or, alternatively, may also be located in different physical locations. Examples of the communication medium that may be used include SCSI, Fibre Channel, or iSCSI, and the like. Some or all of the connections by which the hosts and data storage system may be connected to a communication medium may pass through other communication devices, such as a Connectrix or other switching equipment that may exist such as a phone line, a repeater, a multiplexer or even a satellite.

Each of the host computer systems may perform different types of data operations in accordance with different types of administrative tasks. Any one of the host computers may issue a data request to the data storage system to perform a data operation. For example, an application executing on one of the host computers may perform a read or write operation resulting in one or more data requests to the data storage system.

Note that a read or a write operation used in connection with the system described herein may be a read or a write operation involving a partial track of data or any other quantum or portion of data, including variable length portions of data. If a host performs a write operation to a local device for a write of a partial track of data and data is being migrated to the local device from the remote device, the data of the complete track is read first prior to applying the write operation. The same applies when data is being pulled.

Note that the techniques described herein associated with pushing and/or pulling data may be performed with respect to multiple devices. Additionally, the techniques described herein may be performed with respect to an entirety of a device or a portion of a device.

The examples described herein for purposes of illustration of the techniques should not be construed as any sort of limitation. For example, in the processing associated with performing an online data migration described herein may be performed by any appropriate processors or other components of one or more of the storage devices 64, 66. Additionally, the particular data structures, such as the migration bitmap data structure 90, may also be stored in any appropriate location and may take on any form consistent with the functional description herein.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of controlling communication through a communication resource, comprising:
   allocating a percentage of a maximum bandwidth of the communication resource to a first subset of processes that communicate using the communication resource;
   determining a delay amount between I/O operations for the first subset of processes, wherein the delay amount corresponds to all of the following: the percentage of bandwidth allocated to the first subset of processes, a throughput of the communication resource, and an amount of data corresponding to a single I/O operation;
   waiting an amount of time corresponding to the delay amount between the I/O operations for the first subset of processes, wherein I/O operations for a second subset of processes that use the communication resource are allowed during the delay between the I/O operations for the first subset of processes; and
   periodically recalculating the delay amount according to actual I/O throughput of the first subset of processes, wherein, in response to the actual I/O throughput being greater by at least a predetermined amount than an amount corresponding to the percentage of the maximum bandwidth allocated to the first subset of processes, the delay amount is set to a default value.

2. The method, according to claim 1, wherein the actual I/O throughput is determined by maintaining a byte count of data that is transferred for each I/O operation for the first subset of processes.

3. The method, according to claim 1, wherein the delay amount is increased in response to the actual I/O throughput being greater than the amount corresponding to the percentage of the maximum bandwidth allocated to the first subset of processes and wherein the delay amount is decreased in response to the actual I/O throughput being less than the amount corresponding to the percentage of the maximum bandwidth allocated to the first subset of processes.

4. The method, according to claim 1, wherein the first subset of processes are background processes for copying data.

5. The method, according to claim 4, wherein the second subset of processes include processes that service I/O operations of a host coupled to a storage device.

6. A method of controlling communication through a communication resource, comprising:
   allocating a percentage of a maximum bandwidth of the communication resource to a first subset of processes that communicate using the communication resource;
   determining a delay amount between I/O operations for the first subset of processes, wherein the delay amount corresponds to all of the following: the percentage of bandwidth allocated to the first subset of processes, a throughput of the communication resource, and an amount of data corresponding to a single I/O operation, wherein the delay amount is determined by taking the inverse of the product of the maximum bandwidth, the percentage, and the amount of data transmitted for each I/O operation for the first subset of processes; and
   waiting an amount of time corresponding to the delay amount between the I/O operations for the first subset of processes, wherein I/O operations for a second subset of processes that use the communication resource are allowed during the delay between the I/O operations for the first subset of processes.

7. A non-transitory computer readable-storage medium: storing computer software that controls communication through a communication resource, the computer software stored on the computer-readable storage medium comprising: executable code that determines a delay amount between I/O operations for a first subset of processes that communicate using the communication resource, wherein the delay amount corresponds to all of the following: a percentage of maximum bandwidth of the communication resource allocated to the first subset of processes, a throughput of the communication resource, and an amount of data corresponding to a single I/O operation; executable code that waits an amount of time corresponding to the delay amount between I/O operations for the first subset of processes, wherein I/O operations for a second subset of processes that use the communication resource are allowed during the delay between the I/O operations for the first subset of processes; executable code that periodically recalculates the delay amount according to actual I/O throughput of the first subset of processes; an executable code that sets the delay amount to a default value in response to the actual I/O throughput being greater by at least a predetermined amount than an amount corresponding to the percentage of the maximum bandwidth allocated to the first subset of processes.

8. The non-transitory computer readable-storage medium, according to claim 7, wherein the actual I/O throughput is determined by maintaining a byte count of data that is transferred for each I/O operation for the first subset of processes.

9. The non-transitory computer readable-storage medium, according to claim 7, wherein the computer software further comprises: executable code that increases the delay amount in response to the actual I/O throughput being greater than the amount corresponding to the percentage of the maximum bandwidth allocated to the first subset of processes; and executable code that decreases the delay amount in response to the actual I/O throughput being less than the amount corresponding to the percentage of the maximum bandwidth allocated to the first subset of processes.

10. The non-transitory computer readable-storage medium, according to claim 7, wherein the first subset of processes are background processes for copying data.

11. The non-transitory computer readable-storage medium, according to claim 10, wherein the second subset of processes include processes that service I/O operations of a host coupled to a storage device.

12. A non-transitory computer readable-storage medium: storing computer software that controls communication through a communication resource, the computer software stored on the computer-readable storage medium comprising: executable code that determines a delay amount between I/O operations for a first subset of processes that communicate using the communication resource, wherein the delay amount corresponds to all of the following: a percentage of maximum bandwidth of the communication resource allocated to the first subset of processes, a throughput of the communication resource, and an amount of data corresponding to a single I/O operation, wherein the delay amount is determined by taking the inverse of the product of the maximum bandwidth, the percentage, and the amount of data transmitted for each I/O operation for the first subset of processes: and executable code that waits an amount of time corresponding to the delay amount between I/O operations for the first subset of processes, wherein I/O operations for a second subset of processes that use the communication resource are allowed during the delay between the I/O operations for the first subset of processes.

13. A storage device, comprising:
a plurality of disks that contain data; and
at least one port, coupled to the disks, for providing access to data stored on the disks, wherein the at least one port includes software, stored on a computer-readable storage medium, having executable code that determines a delay amount between I/O operations for a first subset of processes that communicate with the storage device through the port, wherein the delay amount corresponds to all of the following: a percentage of maximum bandwidth of the port allocated to the first subset of processes, a throughput of the port, and an amount of data corresponding to a single I/O operation, wherein the delay amount is determined by taking the inverse of the product of the maximum bandwidth, the percentage, and the amount of data transmitted for each I/O operation for the first subset of processes, and executable code that waits an amount of time corresponding to the delay amount between I/O operations for the first subset of processes, wherein I/O operations for a second subset of processes that communicate with the storage device using the port are allowed during the delay between the I/O operations for the first subset of processes.

14. The storage device, according to claim 13, wherein the software of the port also includes executable code that increases the delay amount in response to actual I/O throughput being greater than an amount corresponding to the percentage of the maximum bandwidth allocated to the first subset of processes and executable code that decreases the delay amount in response to the actual I/O throughput being less than an amount corresponding to the percentage of the maximum bandwidth allocated to the first subset of processes.

15. The storage device, according to claim 13, wherein the first subset of processes are background processes for copying data between the storage device and another storage device.

16. The storage device, according to claim 15, wherein the second subset of processes include processes that service host I/O operations for the storage device.

17. A storage device, comprising:
a plurality of disks that contain data; and
at least one port, coupled to the disks, for providing access to data stored on the disks, wherein the at least one port includes software, stored on a computer-readable storage medium, having executable code that determines a delay amount between I/O operations for a first subset of processes that communicate with the storage device through the port, wherein the delay amount corresponds to all of the following: a percentage of maximum bandwidth of the port allocated to the first subset of processes, a throughput of the port, and an amount of data corresponding to a single I/O operation, executable code that waits an amount of time corresponding to the delay amount between I/O operations for the first subset of processes, wherein I/O operations for a second subset of processes that communicate with the storage device using the port are allowed during the delay between the I/O operations for the first subset of processes, executable code that periodically recalculates the delay amount according to actual I/O throughput of the first subset of processes, and executable code that sets the delay amount to a default value in response to the actual I/O throughput being greater by at least a predetermined amount than an amount corresponding to the percentage of the maximum bandwidth allocated to the first subset of processes.

18. The storage device, according to claim 17, wherein the software of the port also includes executable code that increases the delay amount in response to actual I/O throughput being greater than the amount corresponding to the percentage of the maximum bandwidth allocated to the first subset of processes and executable code that decreases the delay amount in response to the actual I/O throughput being less than an amount corresponding to the percentage of the maximum bandwidth allocated to the first subset of processes.

19. The storage device, according to claim 17, wherein the first subset of processes are background processes for copying data between the storage device and another storage device.

20. The storage device, according to claim 19, wherein the second subset of processes include processes that service host I/O operations for the storage device.

* * * * *